US012420298B2

(12) United States Patent
Barenhoff et al.

(10) Patent No.: US 12,420,298 B2
(45) Date of Patent: Sep. 23, 2025

(54) DISPENSING DEVICE WITH LOCKING MECHANISM

(71) Applicant: APTAR DORTMUND GMBH, Dortmund (DE)

(72) Inventors: Swen Barenhoff, Bönen (DE); Guido Burmann, Dortmund (DE)

(73) Assignee: APTAR DORTMUND GMBH, Dortmund (DE)

( * ) Notice: Subject to any disclaimer, the term of this patent is extended or adjusted under 35 U.S.C. 154(b) by 123 days.

(21) Appl. No.: 18/039,461

(22) PCT Filed: Dec. 6, 2021

(86) PCT No.: PCT/EP2021/084376
§ 371 (c)(1),
(2) Date: May 30, 2023

(87) PCT Pub. No.: WO2022/117888
PCT Pub. Date: Jun. 9, 2022

(65) Prior Publication Data

US 2024/0001387 A1 Jan. 4, 2024

(30) Foreign Application Priority Data

Dec. 4, 2020 (EP) .................................... 20211840

(51) Int. Cl.
*B05B 11/10* (2023.01)

(52) U.S. Cl.
CPC ........ *B05B 11/1059* (2023.01); *B05B 11/103* (2023.01); *B05B 11/1035* (2023.01); *B05B 11/1057* (2023.01)

(58) Field of Classification Search
CPC ........................ B05B 11/1057; B05B 11/1059
(Continued)

(56) References Cited

U.S. PATENT DOCUMENTS 3,840,157 A * 10/1974 Hellenkamp ......... B05B 1/3436 239/375
4,220,264 A 9/1980 Gamadia
(Continued)

FOREIGN PATENT DOCUMENTS

CA 1059083 A 7/1979
CA 2167799 A1 2/1995
(Continued)

OTHER PUBLICATIONS

U.S. Appl. No. 18/039,456, filed May 30, 2023, Burmann et al.
(Continued)

*Primary Examiner* — Paul R Durand
*Assistant Examiner* — Randall A Gruby
(74) *Attorney, Agent, or Firm* — Jason H. Vick; Amped IP LLC

(57) ABSTRACT

A dispensing device for dispensing a fluid is proposed. The dispensing device has a conveying device for conveying the fluid from a container, which can be actuated by means of an actuating lever, the actuating lever being lockable against undesired actuation by means of a locking device. For unlocking, the actuating lever is preferably displaceably mounted. The dispensing device may additionally comprise a securing device which secures the actuating lever against unlocking by means of the locking device. Furthermore, a dispenser for dispensing a fluid with a container and a dispensing device is proposed.

19 Claims, 7 Drawing Sheets

(58) Field of Classification Search
USPC .................................................... 222/153.13
See application file for complete search history.

(56) References Cited

U.S. PATENT DOCUMENTS

| | | | | |
|---|---|---|---|---|
| 4,278,187 | A | 7/1981 | Luedtke | |
| 4,506,805 | A * | 3/1985 | Marcon | B05B 11/0032 222/153.13 |
| 4,558,821 | A * | 12/1985 | Tada | B05B 1/3436 239/383 |
| 4,946,074 | A * | 8/1990 | Grogan | B05B 11/0032 222/402 |
| 4,979,646 | A | 12/1990 | Andris | |
| 5,114,052 | A * | 5/1992 | Tiramani | B05B 15/30 222/207 |
| 5,156,304 | A | 10/1992 | Battegazzore | |
| 5,238,156 | A | 8/1993 | Andris | |
| 5,303,867 | A | 4/1994 | Peterson | |
| 5,363,993 | A | 11/1994 | Mascitelli et al. | |
| 5,476,195 | A | 12/1995 | Oder et al. | |
| 5,560,545 | A * | 10/1996 | Grogan | B05B 7/0408 239/304 |
| 5,561,901 | A | 10/1996 | Stahley et al. | |
| 5,647,539 | A | 7/1997 | Dobbs et al. | |
| 5,711,457 | A | 1/1998 | Wanbaugh et al. | |
| 5,722,569 | A * | 3/1998 | Foster | B05B 11/1011 222/153.13 |
| 5,823,396 | A * | 10/1998 | Vollmerhaus | B05B 11/1059 222/384 |
| 5,839,621 | A * | 11/1998 | Tada | B05B 11/0072 222/384 |
| 5,887,761 | A | 3/1999 | Foster et al. | |
| 6,006,950 | A * | 12/1999 | Watanabe | B05B 11/1059 222/384 |
| 6,244,469 | B1 | 6/2001 | Knickerbocker | |
| 6,279,784 | B1 | 8/2001 | O'Neill | |
| 6,286,723 | B1 * | 9/2001 | Sweeton | B05B 11/1077 222/384 |
| 6,527,202 | B1 | 3/2003 | Tseng | |
| 6,548,770 | B1 | 4/2003 | Stewart et al. | |
| 6,550,694 | B1 | 4/2003 | Foster et al. | |
| 6,669,058 | B1 * | 12/2003 | Sweeton | B05B 11/1059 222/153.13 |
| 7,775,401 | B2 | 8/2010 | Banco et al. | |
| 7,997,455 | B2 | 8/2011 | Alluigi | |
| 9,610,598 | B2 * | 4/2017 | Alluigi | B05B 11/1057 |
| 9,931,657 | B2 * | 4/2018 | Gonzalez | B05B 11/1014 |
| 10,640,282 | B2 | 5/2020 | Ehrensperger et al. | |
| 11,135,609 | B2 | 10/2021 | Corona et al. | |
| 11,167,301 | B2 * | 11/2021 | Alluigi | B05B 11/1077 |
| 11,548,022 | B2 * | 1/2023 | Burmann | B05B 11/0044 |
| 12,151,254 | B2 * | 11/2024 | Alluigi | B05B 11/1074 |
| 12,194,483 | B2 | 1/2025 | Goettke et al. | |
| 2005/0184093 | A1 | 8/2005 | Brunerie et al. | |
| 2006/0113329 | A1 | 6/2006 | Walters et al. | |
| 2007/0194050 | A1 | 8/2007 | Krampen et al. | |
| 2012/0024904 | A1 | 2/2012 | Doulin et al. | |
| 2013/0119157 | A1 | 5/2013 | Alluigi | |
| 2013/0277397 | A1 | 10/2013 | Erickson et al. | |
| 2014/0183283 | A1 * | 7/2014 | Tada | B05B 11/1011 239/527 |
| 2014/0231541 | A1 | 8/2014 | Krampen | |
| 2015/0298149 | A1 | 10/2015 | Alluigi | |
| 2016/0158780 | A1 | 6/2016 | Alluigi | |
| 2016/0242528 | A1 * | 8/2016 | Schmitz | B05B 11/1001 |
| 2016/0332180 | A1 | 11/2016 | Bruder et al. | |
| 2018/0056314 | A1 | 3/2018 | Schroeder | |
| 2018/0070780 | A1 | 3/2018 | Rodriguez | |
| 2018/0193857 | A1 | 7/2018 | Maas et al. | |
| 2019/0151875 | A1 | 5/2019 | Laidler | |
| 2021/0001361 | A1 * | 1/2021 | Burmann | B05B 11/1059 |
| 2024/0399402 | A1 | 12/2024 | Zavarella et al. | |
| 2025/0018411 | A1 | 1/2025 | Knight | |
| 2025/0041888 | A1 | 2/2025 | Mittal et al. | |
| 2025/0065352 | A1 * | 2/2025 | Sakata | B05B 11/1063 |

FOREIGN PATENT DOCUMENTS

| | | | |
|---|---|---|---|
| CN | 101244410 | A | 8/2008 |
| CN | 102099122 | A | 6/2011 |
| CN | 102464133 | A | 5/2012 |
| CN | 107708873 | | 2/2018 |
| DE | 2744654 | A1 | 4/1978 |
| DE | 8316737 | U1 | 10/1983 |
| DE | 8713891 | U1 | 2/1989 |
| DE | 4411031 | A1 | 1/1995 |
| DE | 19803693 | A1 | 8/1999 |
| DE | 10221667 | A1 | 12/2003 |
| EP | 0117898 | A2 | 9/1984 |
| EP | 0368062 | A1 | 5/1990 |
| EP | 0492354 | A1 | 7/1992 |
| EP | 0803295 | A2 | 10/1997 |
| EP | 1815914 | A1 | 8/2007 |
| EP | 2345480 | A1 | 7/2011 |
| EP | 2767348 | A1 | 8/2014 |
| EP | 3552989 | A1 | 10/2019 |
| JP | S54-93213 | A | 7/1979 |
| JP | 2000-042458 | A | 2/2000 |
| JP | 3730018 | B2 | 12/2005 |
| JP | 2007-244937 | A | 9/2007 |
| WO | WO 98/03427 | | 1/1998 |
| WO | WO 01/03851 | | 1/2001 |
| WO | WO 2007/065065 | A2 | 6/2007 |
| WO | WO 2012/064790 | A1 | 5/2012 |
| WO | WO 2015/055266 | | 4/2015 |
| WO | WO 2015/106868 | | 7/2015 |
| WO | WO 2016/150889 | | 9/2016 |
| WO | WO 2019/175349 | A1 | 9/2019 |

OTHER PUBLICATIONS

International Search Report for International Application No. PCT/EP2021/084376, mailed Mar. 4, 2022.

Written Opinion for International Application No. PCT/EP2021/084376, mailed Mar. 4, 2022.

* cited by examiner

DISPENSING DEVICE WITH LOCKING MECHANISM

CROSS-REFERENCE TO RELATED APPLICATIONS

The present application is a national stage application under 35 U.S.C. 371 of PCT Application No. PCT/EP2021/084376, filed 6 Dec. 2021, which designated the United States, which PCT application claimed the benefit of European Patent Application No. 20211840.2, filed 4 Dec. 2020, each of which are incorporated herein by reference in their entirety.

BACKGROUND

The present invention relates to a dispensing device for dispensing a fluid, and to a dispenser for dispensing a fluid.

In particular, the present invention relates to a dispenser for the storage and the discharge and/or dispensing of cleaning agents or pharmaceutical or cosmetic fluids, in particular liquids. A fluid can be accommodated in a container of the dispenser, which fluid can be conveyed out of the container by means of a dispensing device attached to the container and can be dispensed by means of the dispensing device. The fluid may be dispensed in various dispensing forms, for example as a spray or aerosol or as a foam.

WO 2019/175349 A1 relates to a dispensing device for dispensing a fluid, comprising a pumping device for conveying the fluid from a container. The pumping device comprises a bellows for pumping and can be actuated by means of a manually operable actuating lever. The actuating lever is securable against undesired actuation. In a first embodiment, an actuating arm of the actuating lever is folded up in a secured position, and is in particular secured to a dispensing head of the dispensing device. In a second embodiment, the actuating lever comprises a blocking element which is pivotable relative to the actuating arm and which can be arranged between the actuating arm and a housing of the dispensing device, thereby blocking pivoting of the actuating lever.

EP 0 117 898 A2 relates to a trigger-type sprayer in which a piston is reciprocated by rocking a trigger, whereby a liquid in a container is sucked up, pressurized and sprayed. The sprayer may comprise a latch portion which is integrally attached to the sprayer housing by means of hinge and can be coupled to an engaging portion of the trigger to lock the trigger or prevented it from rocking. The latch portion can be disengaged from the trigger to allow the trigger to rock freely, wherein the latch portion is rocked around the hinge into a corresponding recess of the sprayer housing.

SUMMARY

It is an object of the present invention to enable a simple, reliable and/or safe functioning and/or handling and/or a simple construction of a dispensing device and/or dispenser and/or to prevent an actuation and/or an escape/leakage of fluid during transport of a dispenser in a simple and/or inexpensive manner.

The above object is solved by a dispensing device according to claim 1 or 12 or by a dispenser as disclosed herein.

A proposed dispensing device is designed to dispense a fluid, in particular a fluid received in an associated container and/or in a container connected to the dispensing device.

The dispensing device comprises a conveying device for conveying the fluid. The conveying device is preferably a pump device or designed as a pump or has such a pump device. Particularly preferably, the conveying device or pumping device comprises a flexible bellows for conveying the fluid. In particular, the fluid can be conveyed into the bellows by an expansion of the bellows and/or a negative pressure resulting from the expansion and can be dispensed from the bellows by a compression of the bellows. However, other solutions are also possible here. For example, instead of a bellows, the pumping device may comprise a pump piston or the like as a conveying element. Furthermore, the conveying device may also be implemented without a pump or pumping device, for example in the case of a pressurized container.

The dispensing device has a manually operable actuating lever for actuating the conveying device and/or dispensing device. The actuating lever is preferably pivotably arranged and/or pivotably mounted on the dispensing device. For this purpose, the dispensing device has a corresponding mounting part or bearing part which is designed for the pivot mounting of the actuating lever.

According to the proposal, the actuating lever can be locked against (undesired) actuation in a locked position by means of a locking device. In this way, it can be prevented that, during delivery and/or transport of a dispenser filled with a liquid and having a proposed dispensing device, fluid escapes unintentionally from the dispenser. In particular, there is no need to provide or to attach to the dispensing device or the dispenser an additional transport safety device and/or a transport safety device separate from the dispenser or the dispensing device. This enables cost-effective production and/or delivery, since in particular additional safety devices and/or safety parts are not required. In particular, the proposed solution is also particularly environmentally friendly, since less waste is produced.

According to one aspect of the present invention, the dispensing device or the dispenser provided with the dispensing device is configured such that the actuating lever is displaceable/shiftable relative to the bearing part to move or bring the actuating lever from the locked position to an actuation position. In the actuation position, the actuating lever is unlocked and/or pivoting of the actuating lever is enabled. In this way, a locking device is realized which has a particularly simple and/or inexpensive structure and/or is easy or convenient to operate.

Particularly preferably, the locking device is formed by the actuating lever and/or the bearing part. Thus, additional parts can be omitted, which is conducive to a simple and/or inexpensive structure. This is conducive both to a simple and inexpensive structure and to easy and convenient operation.

Preferably, the unlocking of the actuating lever is reversible. In other words, it is preferably possible to move the actuating lever (again) from the actuation position to the locked position or to lock the actuating lever (again), when required. This is conducive to safe handling of the dispensing device.

Preferably, the actuating lever is displaceable or shiftable from the locked position to the actuation position and/or from the actuation position to the locked position in a linear manner or along a preferably only slightly curved path. This is conducive to a simple structure and a simple or convenient operation.

The actuating lever is preferably displaceable from the locked position into the actuation position and/or from the actuation position into the locked position in a latching manner. This is conducive to simple and/or safe construction and simple and/or safe operation.

Preferably, the actuating lever is snapped into the locked position and/or actuation position and/or is held in a snap-in, latching, catching, engaging and/or detenting manner in the locked position and/or actuation position. In particular, a certain holding force must be overcome in order to displace the actuating lever from the locked position to the actuation position, or vice versa. In this way, it can be ensured that the dispensing device or the actuating lever is not inadvertently unlocked or locked.

Preferably, the actuating lever automatically snaps or engages when unlocked into the actuation position and/or when (re)locked into the locked position. Furthermore, the snapping or engagement may be audible and/or perceptible, so that a user receives an auditory and/or haptic feedback that the actuating lever has assumed the actuation position or the locked position. This is conducive to an easy and/or convenient operation.

Preferably, the actuating lever for unlocking is pushable/pressable in the direction of a housing of the dispensing device and/or can be pressed/pushed partially into the housing. This is conducive to particularly easy handling. In particular, the actuating lever can first be pressed in a smooth/continuous hand movement so that it is displaced from the locked position into the actuation position and then pressed down or pivoted to actuate the dispensing device or dispense the fluid. Accordingly, the actuating lever can preferably be pulled or extracted or (with)drawn in the opposite direction for (re)locking.

Preferably, the actuating lever is locked against pivoting in the locked position by a form closure or form fit or positive lock. In this way, a particularly simple locking device is implemented.

The locking device, in particular the actuating lever or the bearing part, preferably has a locking element, the locking element blocking a pivoting of the actuating lever, in particular in a form-fitting manner, in the locked position and releasing it in the actuation position. In particular, the locking element engages in a corresponding recess of the locking device in the locked position. This realizes a particularly simple locking device or locking.

Particularly preferably, the locking element is arranged on the actuating lever and the recess is arranged on or formed by the bearing part or, conversely, the locking element is arranged on the bearing part and the recess is arranged on the actuating lever. In this way, additional parts can be omitted and/or a particularly simply constructed locking device can be realized.

According to a further aspect of the present invention, which may also be implemented independently, the dispensing device or the dispenser provided with the dispensing device comprises—in addition to the locking device—a protection or securing device. The securing device is designed to secure/protect the dispensing device and/or the actuating lever and/or the locking device against unlocking. Direct unlocking of the locking device—at least when used for the first time—is preferably prevented or blocked by the securing device. In particular, the securing device must first be actuated and/or the locking device must first be unblocked or released from the securing. This is conducive to particularly safe construction and/or transport, in particular since the dispensing device and/or the actuating lever is doubly secured or locked.

In order to distinguish between the locking device and the securing device, corresponding terminology is used in the following. Terms such as "lock", "unlock", "locking", "locking element", etc. preferably refer exclusively to the locking device, unless explicitly mentioned otherwise. Correspondingly, terms such as "secure", "unsecure", "securing", "securing element", etc. preferably refer exclusively to the securing device, unless explicitly mentioned otherwise.

Releasing the securing/protection of the dispensing device, the locking device and/or the actuating lever is preferably irreversible. In particular, the securing device can only be actuated or released once or only before the first use. Re-securing by means of the securing device is preferably not possible. Preferably, it is subsequently sufficient, if required, to lock the dispensing device and/or the actuating lever by means of the locking device. This is conducive to particularly simple handling.

The securing device preferably serves as a tamper-evident seal or closure. The state or position of the securing device (actuated/unsecured or unactuated/secured) preferably allows a user to see whether the dispenser is in the delivery state or has already been used/unsecured. This is conducive to safe handling.

The delivery state is preferably the state in which the dispenser or dispensing device is delivered or shipped, in particular from the factory, and/or in which the dispenser or dispensing device is sold. In particular, the delivery state is the state before first use of the dispenser or dispensing device.

Preferably, the securing device comprises a securing element which blocks the unlocking of the actuating lever, in particular a displacement of the actuating lever from the locked position into the actuation position, preferably in a form-fitting manner.

Particularly preferably, the securing element is arranged on or formed by the actuating lever. In this way, a particularly simple structure of the securing device is realized. Alternatively, however, the securing element may also be formed by another part of the dispensing device, for example a housing. Preferably, the securing element is formed integrally or as one piece with the actuating lever or another part of the dispensing device.

Preferably, the securing element, in particular in its securing position, is arranged in such a way that it blocks an in particular linear displacement, in particular a pushing/pressing (in), of the actuating lever. Particularly preferably, the securing element, in particular in its securing position, is in contact with the housing of the dispensing device or comes into contact with it before the actuation position is reached, so that the displacement or pushing/pressing (in) of the actuating lever is prevented or blocked.

Preferably, the securing element is held in its securing position by a material bond and/or by a predetermined breaking point, preferably on the actuating lever. This is conducive to a particularly simple structure. In particular, it can thus be realized in a particularly simple manner that the release or unblocking is irreversible.

In order to unsecure or release or unblock the locking device and/or the displaceability of the actuating lever, the securing element can be brought out of its securing position. Particularly preferably, the securing element can be pressed in, hinged away, folded away and/or folded up and/or removed from the dispensing device or the actuating lever for this purpose, for example by breaking it out. This enables a particularly simple release or unblocking. Furthermore, a missing, pressed-in or folded-up securing element indicates that the dispensing device, the actuating lever and/or the locking device is unsecured, unblocked or released. The function as a tamper-evident seal is thus realized in a particularly simple manner.

The proposed dispenser for dispensing a fluid is provided with the proposed dispensing device and a container. The fluid is conveyable from the container by means of the dispensing device and dispensable from the dispenser by means of the dispensing device. Thus, the corresponding advantages are obtained.

The foregoing and subsequent aspects and features of the present invention may be combined with each other as desired, but each may also be implemented independently.

Further aspects, features, advantages and characteristics of the present invention will be apparent from the claims and the following description of a preferred embodiment with reference to the drawings.

DETAILED DESCRIPTION

In the figures, the same reference signs are used for the same or similar components and devices, wherein the same or corresponding advantages and features may result, even if a repeated description is omitted.

Figure 1:
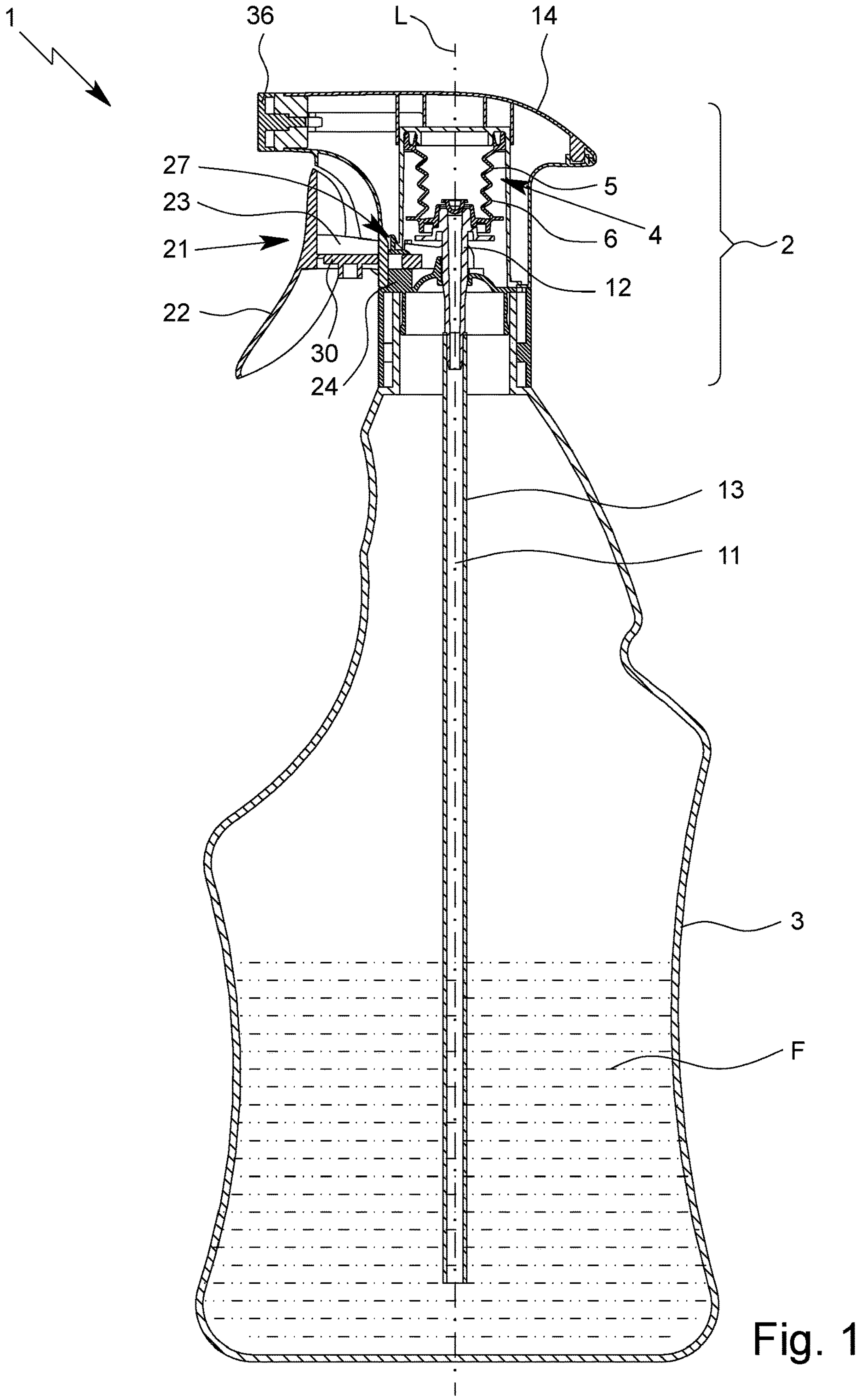
FIG. 1 is a sectional view of a proposed dispenser with a proposed dispensing device.

FIG. 1 shows a proposed dispenser 1 with a proposed dispensing device 2 and a container 3.

A fluid F can be received/accommodated in the dispenser 1 or container 3. The dispensing device 2 is designed or provided for conveying the fluid F from the container 3 and for discharging or dispensing the fluid F.

The fluid F is preferably a (low viscosity) liquid, in particular a cleaning liquid or the like, but may also have a viscous to pasty consistency and/or a high viscosity.

The fluid F is dispensed by the dispensing device 2 preferably or optionally as a spray or aerosol and/or as a foam. However, other solutions are also possible here.

The dispenser 1 is preferably marketed and/or sold to an end customer as a disposable article and filled with the fluid F. The dispenser 1 is particularly suitable for cleaning liquids, such as glass cleaner or the like, but can also be used for any other fluids F.

Preferably, the dispenser 1 and/or the dispensing device 2 have/has a (common) central axis or longitudinal axis L.

The axis L is preferably oriented at least substantially plumb/upright (vertical) in a usual storage position and/or use position of the dispenser 1, as also shown in the figures. In particular, in use, the dispensing device 2 or an outer housing 14 of the dispensing device 2 is typically at the top and the container 3 is at the bottom. In particular, at least in the storage position, the axis L is at least substantially parallel to gravity. In the storage position, the dispenser 1 preferably rests on a bottom/base of the container 3.

In the present invention, the term “axial” direction or movement preferably refers to a direction or movement that is along or parallel to the axis L. In an analogous manner, the term “radial” preferably also refers to the axis L.

In the present invention, the terms “top” and “bottom” and variations thereof and terms similar thereto preferably have the usual common language meaning with respect to the preferred orientation or position of use, and in the present invention preferably refer to the storage position of the dispenser 1 or dispensing device 2 as shown in the figures.

The proposed dispensing device 2 comprises an actuating lever 21 which is in particular pivotable. A dispensing of the fluid F from the dispenser 1 and/or the dispensing device 2 is preferably performed by manual actuation and/or pivoting of the actuating lever 21.

Preferably, the dispensing device 2 comprises a conveying device 4 for conveying the fluid F, in particular from the container 3. The conveying device 4 is preferably actuatable by means of the actuating lever 21.

In the preferred embodiment shown, the conveying device 4 is preferably designed as a pumping device and/or comprises a pumping device or pump. In particular, the conveying device 4 is designed to convey or pump the fluid F—preferably only in the unlocked state—from the container 3 into the dispensing device 2 and/or to dispense the fluid F from the dispensing device 2 and/or via a closure element or dispensing element 36. By manually actuating and/or pivoting the actuating lever 21, the fluid F is preferably pumped out of the container 3 and/or dispensed from the dispensing device 2 and/or via the closure element or dispensing element 36.

According to the proposal, the dispensing device 2 and/or the actuating lever 21 is lockable or locked in a locked position, in particular in the delivery state. In the locked position, actuation and/or pivoting of the actuating lever 21 is locked or not possible. In particular, an actuation of the conveying device 4 and/or a dispensing of the fluid F is locked or blocked/inhibited. The state of the dispensing device 2 with the actuating lever 21 in the locked position is in the following referred to as the locked state.

Figure 2A:
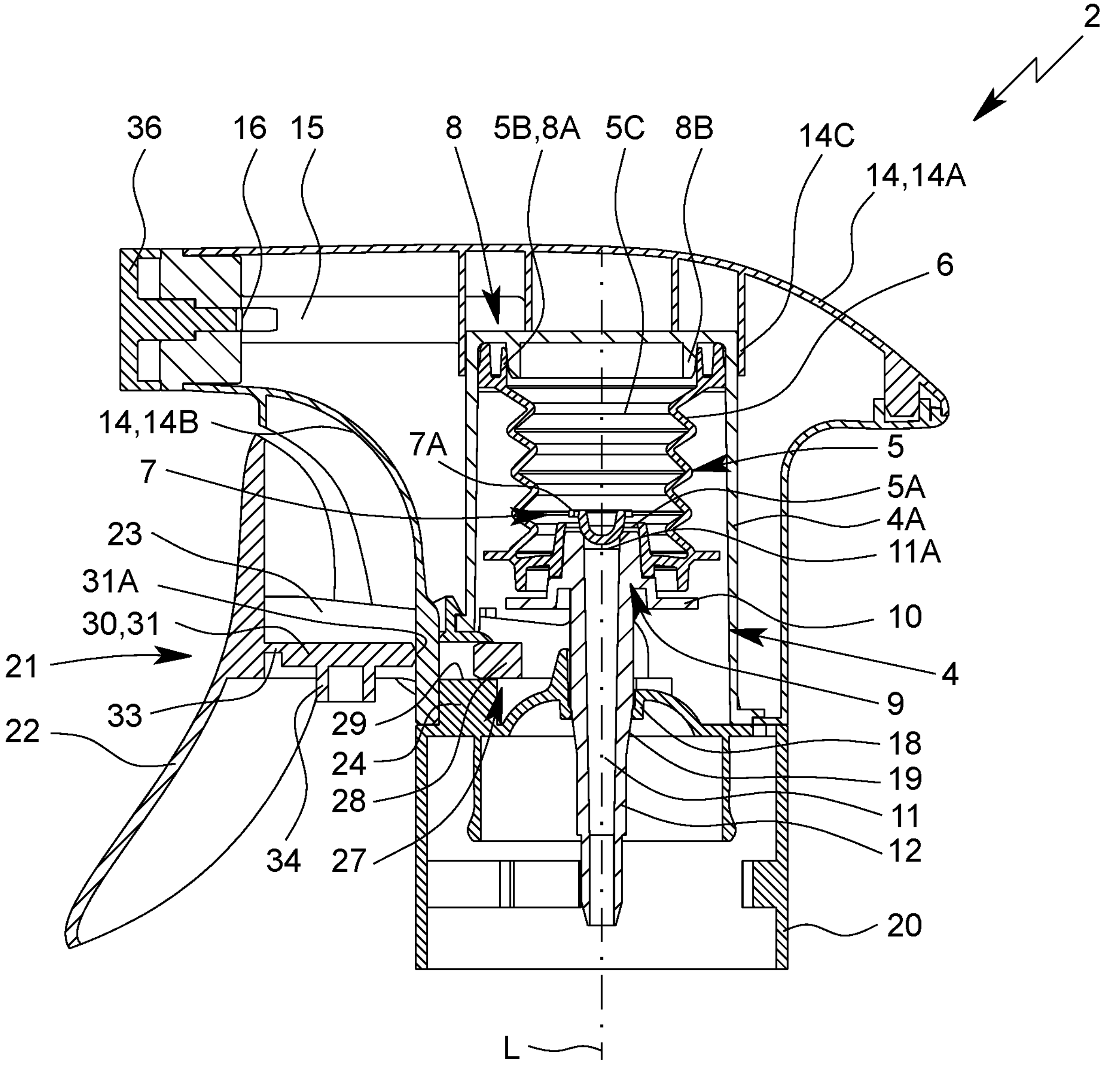
FIG. 2A is a magnified sectional view of the dispensing device in a locked state.

In FIG. 1, the dispensing device 2 is shown in the locked state and/or with the actuating lever 21 in the locked position. FIG. 2A is an enlarged view of the dispensing device 2 according to FIG. 1 in the locked state.

Figure 2B:
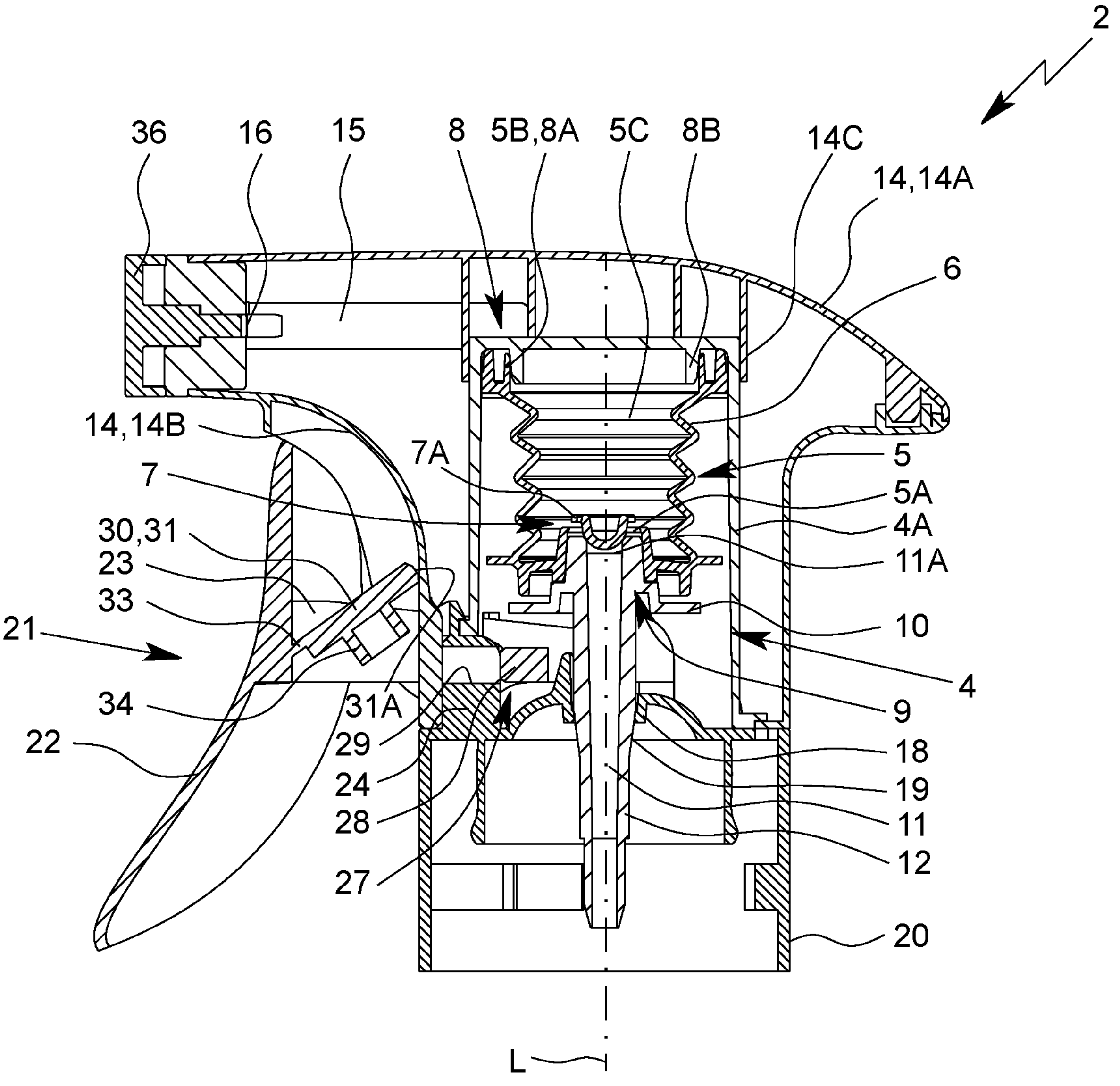
FIG. 2B is a sectional view of the dispensing device in an unlocked state.

FIG. 2B shows the dispensing device 2 in a section corresponding to FIG. 2A in an unlocked state and/or with the actuating lever 21 in an actuation position. In the unlocked state or in the actuation position, manual actuation and/or manual pivoting of the actuating lever 21 and/or of the conveying device 4 is enabled or unlocked for dispensing of the fluid F.

Figure 2C:
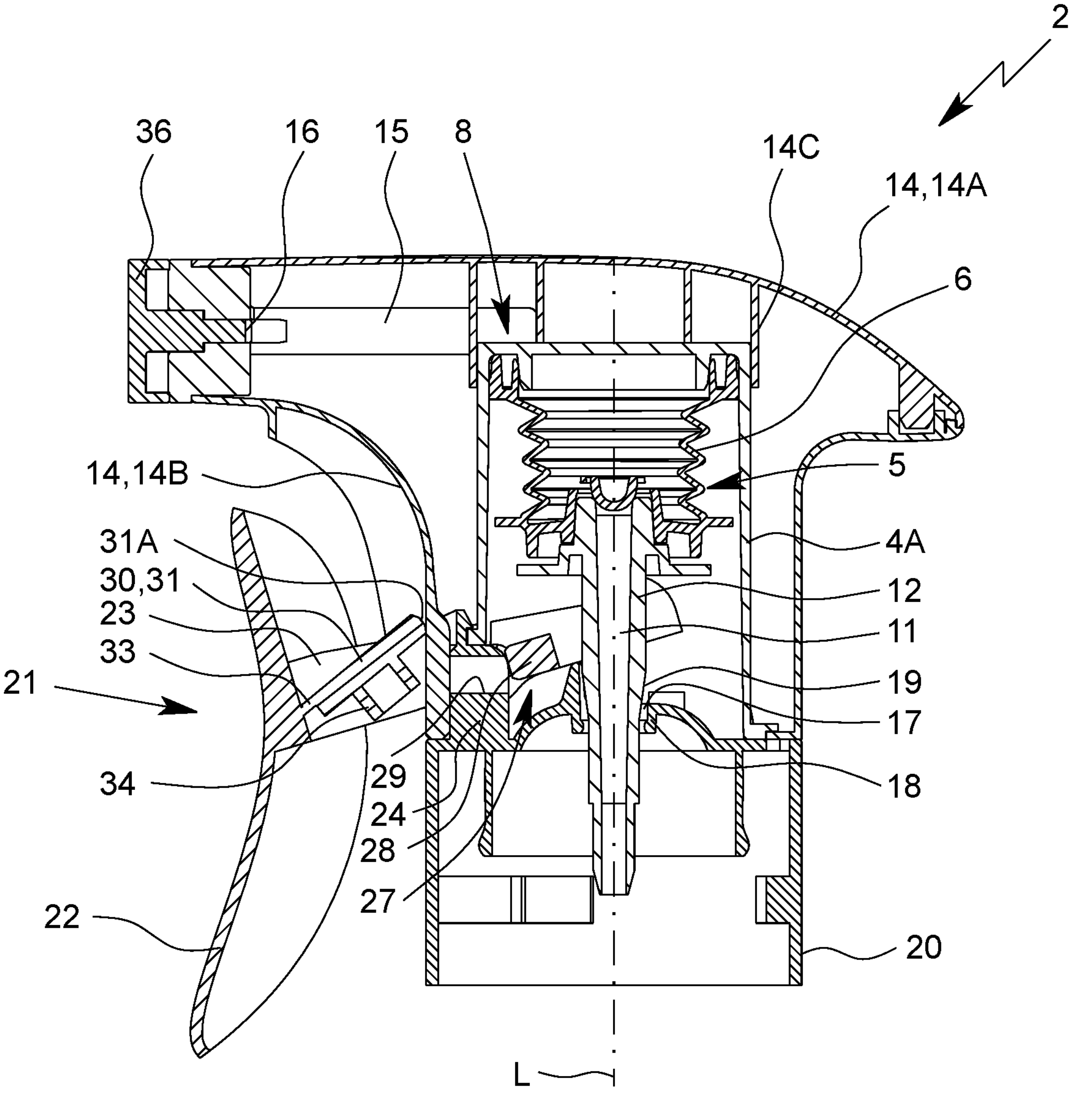
FIG. 2C is a sectional view of the dispensing device with actuated conveying device.

FIG. 2C shows the dispensing device 2 in a section corresponding to FIG. 2A and FIG. 2B in the actuated state or with actuated, in particular pivoted, actuating lever 21 and/or with actuated conveying device 4.

In the following, a preferred structure of the dispensing device 2, in particular the conveying device 4, is first described in more detail with reference to FIG. 1 and FIGS. 2A to 2C. A preferred locking device 27 and securing device 30 are subsequently described.

The design/construction of the conveying device 4 as a pumping device described in the following is preferred, but not essential. The following description is therefore merely exemplary.

In the illustrated preferred embodiment of the conveying device 4, the latter comprises a bellows 5 or a pumping device is formed by the bellows 5. However, instead of the bellows 5, other solutions for a pumping device are also possible. For example, instead of the bellows 5, a cylinder-piston arrangement is also conceivable, for example similar to the cylinder-piston arrangement described in U.S. Pat. No. 3,840,157.

The conveying device 4 preferably comprises a conveyor housing 4A. The conveyor housing 4A is preferably at least substantially sleeve-like or ring-like or hollow-cylindrical and/or arranged coaxially to the axis L.

Preferably, the pumping device and/or the bellows 5 are at least partially arranged within the conveyor housing 4A or accommodated within the conveyor housing 4A.

Preferably, the bellows 5 is arranged (completely) within the conveyor housing 4A and/or coaxially thereto.

Preferably, the bellows 5 is flexible and/or elastically deformable and/or the bellows 5 consists of a flexible and/or elastically deformable material.

The bellows 5 is preferably designed/configured to return, after a deformation, to an initial position or unactuated position or rest position assumed before the deformation.

The bellows 5 is preferably installed or arranged in the dispenser 1 and/or the dispensing device 2 and/or the conveying device 4 and/or the conveyor housing 4A in a pre-tensioned and/or (slightly) compressed manner. This supports in particular a reliable conveying of the fluid F.

The bellows 5 is preferably at least substantially cylindrical or hollow cylindrical. A lateral surface or side wall 6 of the bellows 5 is preferably wavy or corrugated. Preferably, this increases the flexibility and/or elastic restoring force that drives or moves the bellows 5 back to the initial position or rest position. Furthermore, the wavy design preferably avoids damage in case of deformation of the bellows 5 and/or increases the stability of the bellows 5.

The bellows 5 and/or the side wall 6 preferably runs coaxially with the central or longitudinal axis L of the dispenser 1 and/or the dispensing device 2.

The conveying device 4 and/or the bellows 5 preferably comprises an inlet 5A for the fluid F, an outlet 5B for the fluid F and a pumping chamber or interior chamber 5C for receiving the fluid F. The interior chamber 5C is preferably formed between the inlet 5A and the outlet 5B and/or is laterally and/or radially delimited by the side wall 6.

Preferably, the conveying device 4 and/or the bellows 5 comprises an inlet valve 7 at the inlet 5A and an outlet valve 8 at the outlet 5B. Preferably, the inlet valve 7 and the outlet valve 8 are each formed as a one-way valve. The inlet valve 7 enables or controls a supply of the fluid F to the conveying device 4 and/or the bellows 5. The outlet valve 8 enables or controls a discharge of the fluid F from the outlet 5B of the conveying device 4 and/or the bellows 5.

The inlet valve 7 and the outlet valve 8 preferably open and/or close pressure-controlled and/or automatically, in particular by a pressure difference present at the respective valve 7, 8. A preferred concrete design/construction of the valves 7, 8 will be discussed in more detail later.

The conveying device 4 and/or the bellows 5 preferably comprises a base 9. The base 9 is preferably formed as a component which is separate and/or separately manufactured from the bellows 5.

The base 9 is preferably axially movable and/or arranged within the conveyor housing 4A.

The base 9 is connected, in particular on the inlet side, to the bellows 5. The bellows 5 can be connected to the base 9 in a force-fitting or friction-fitting and/or material-fitting manner or can be fastened to the base 9, in particular latched, snapped, bonded, welded and/or injection-molded.

The base 9 preferably comprises a bottom element 10. The bottom element 10 is preferably plate-like and/or preferably forms a (bottom) closing surface and/or a (bottom and/or end) closure of the conveying device 4 and/or of the bellows 5 and/or of the interior chamber 5C. The bottom element 10 is preferably at least substantially circular disc-like and/or forms an annular surface.

Preferably, the base 9 comprises or forms a feed channel or supply channel 11 for the fluid F, in particular extending axially or parallel to or along the axis L. Preferably, the supply channel 11 opens into the inlet 5A of the bellows 5.

The supply channel 11 is preferably formed and/or delimited by a conduit 12 of the base 9.

The conduit 12 and the bottom element 10 are preferably formed as a single piece.

The base 9 with the bottom element 10 and the conduit 12 may, for example, be designed and/or manufactured as an injection molded component and/or made of plastic.

Preferably, the bottom element 10 is spaced from the upper axial end of the conduit 12 or the end of the conduit 12 facing the bellows 5 and/or is spaced from the lower axial end of the conduit 12 or the end of the conduit 12 facing the container 3.

Particularly preferably, the conduit 12 forms a connection and/or protrudes downwardly and/or into the container 3.

The dispenser 1 and/or the dispensing device 2 and/or the conveying device 4 preferably comprises a riser 13 for the fluid F. The riser 13 is preferably connected to the bellows 5 and/or the base 9, in particular to the supply channel 11 and/or the conduit 12, and/or arranged at a lower end and/or at an end of the base 9 and/or conduit 12 facing away from the bottom element 10 and/or the bellows 5. The riser 13 may be plugged into the conduit 12, or plugged onto the conduit 12, or otherwise connected to the conduit 12.

Preferably, the riser 13 forms an extension of the conduit 12 and/or the supply channel 11. Preferably, the conduit 12 and the riser 13 together form and/or delimit the supply channel 11.

Preferably, the dispenser 1 and/or dispensing device 2 comprises an outer housing 14.

Preferably, the outer housing 14 forms an (overall) outer housing of the dispensing device 2 or part of an (overall) outer housing.

Preferably, the conveying device 4 is arranged or held in the outer housing 14. Particularly preferably, the outer housing 14 is configured to receive the conveying device 4 and/or the bellows 5.

In the illustrative example, the outer housing 14 is formed in two parts and/or has an upper housing part 14A and a lower housing part 14B. However, other solutions are also possible here.

The outer housing 14, in particular the upper housing part 14A, preferably comprises a fastening part 14C for connecting or fastening the conveying device 4 and/or the bellows 5 to the outer housing 14.

Preferably, the dispensing device 2 and/or conveying device 4 comprises or forms an outlet channel 15 extending in particular transversely or perpendicularly to the axis L.

Preferably, the outlet channel 15 is arranged in the outer housing 14. Preferably, the outlet channel 15 is fluidically connected or connectable to the outlet 5B and opens into a channel opening 16. Preferably, the fluid F can exit the outer housing 14 and/or be dispensed from the dispenser 1 or dispensing device 2 via the outlet channel 15 and the channel opening 16.

In the illustrative example, the outlet channel 15 is preferably formed by the conveying device 4 or its conveyor housing 4A. However, other solutions are also possible here. For example, the outlet channel 15 could also be formed by the outer housing 14, in particular its upper housing part 14A. It is also possible that the outlet channel 15 is formed as a separate component, which is preferably inserted or insertable into the outer housing 14.

As already mentioned at the beginning, the dispensing device 2 and/or the outer housing 14 preferably comprises the closure element or dispensing element 36. The closure element or dispensing element 36 is preferably arranged at the location of fluid dispensing or in the direction of fluid dispensing behind the outlet channel 15 and/or the channel opening 16. The fluid F is preferably dispensed at the closure element or dispensing element 36, and/or must first pass through the closure element or dispensing element 36 before it can be dispensed.

The closure element or dispensing element 36 may be designed such that when the fluid F passes through, a desired dispensing form of the fluid F is achieved or effected, for example as a spray or aerosol and/or foam. In particular, the closure element or dispensing element 36 may comprise a passage opening with a grid (not shown) through which the fluid F must pass before being dispensed.

The closure element or dispensing element 36 may be designed to selectively or as needed close the channel opening 16 (fluid-tight) and/or produce different dispensing forms of the fluid F.

Preferably, the closure element or dispensing element 36 is rotatable to selectively arrange different passage openings behind the channel opening 16 and/or to close or cover the channel opening 16 (fluid-tight).

In the preferred embodiment shown, the outlet channel 15 is preferably arranged off-center at the conveyor housing 4A. It is therefore located behind the sectional plane in FIG. 1 and FIGS. 2A to 2C. Accordingly, a passage opening of the closure element or dispensing element 36 is not visible/shown.

When using the dispenser 1 for the first time, it may be necessary to first actuate the conveying device 4 and/or the actuating lever 21 a few times in order to remove air from the conveying device 4 and/or to convey or pump fluid F from the container 3 into the dispensing device 2 and/or the conveying device 4 and/or the bellows 5 for the first time.

When the conveying device 4 and/or the actuating lever 21 is actuated, the fluid F preferably passes from the container 3 into the dispensing device 2 and/or the conveying device 4 and/or the bellows 5 via the supply channel 11 and/or the conduit 12 and/or the riser 13.

Preferably, the inlet valve 7 is designed/configured to open when the fluid F is conveyed by the conveying device 4 and/or when fluid pressure is present on the supply channel side, thereby allowing the fluid F to be conveyed from the supply channel 11 through the inlet valve 7 into the interior chamber 5C of the bellows 5.

The bellows 5 is preferably positionable or arrangeable in an unactuated position or rest position shown in FIGS. 1, 2A and 2B and in an actuated or compressed position shown in FIG. 2C and/or is preferably deformable into these positions.

Preferably, the bellows 5 is adapted to automatically assume or return to the rest position, in particular by elastic return, when no force deforming the bellows 5 from the rest position acts on the bellows 5. Preferably, the bellows 5 is compressed axially or along the axis L in the actuated position. In particular, the compression of the bellows 5 takes place axially and/or parallel to the axis L and/or by pushing together or folding of the corrugated side wall 6.

On the outlet side, the bellows 5 is preferably held or fixed in a stationary and/or immobile manner, in particular by or at the conveyor housing 4A and/or outer housing 14. Preferably, the outlet 5B and/or the conveyor housing 4A do not change their (axial) position relative to the outer housing 14 and/or the container 3 when the bellows 5 is compressed or deformed and/or when the dispensing device 2 and/or the dispenser 1 is actuated.

Preferably, the bellows 5 is movably held or fixed at the inlet side, in particular by or to the base 9. Preferably, the inlet 5A and/or the base 9 change their (axial) position relative to the conveyor housing 4A, the outer housing 14 and/or the container 3 upon compression or deformation of the bellows 5 and/or upon actuation of the dispensing device 2 and/or the dispenser 1.

Preferably, an axial movement of the base 9, in particular upwards and/or in the direction of the bellows 5, and/or a compression or volume reduction of the bellows 5 occurs during or by an actuation of the conveying device 4 and/or of the actuating lever 21.

The compression or volume reduction of the bellows 5 causes an increased pressure of the fluid F located in the interior chamber 5C of the bellows 5, so that the fluid F is present at an increased pressure at the outlet valve 8, by which the outlet valve 8 preferably opens.

Thus, the compression of the bellows 5 preferably causes the fluid F to enter the outlet channel 15 through the outlet valve 8 and to leave the outlet channel 15 via the channel opening 16 and/or the dispensing element 36, and thus to be dispensed by or out of the dispensing device 2.

When the actuation of the conveying device 4 is terminated and/or no compressive force acts on the bellows 5 (anymore), the bellows 5 preferably returns to the rest position, in particular by elastic return.

Preferably, the expansion of the bellows 5 from the compressed or actuated position to the rest position reduces the pressure in the interior chamber 5C of the bellows 5 and/or a negative pressure is created in the bellows 5 or its interior chamber 5C during the expansion, which preferably closes the outlet valve 8. Furthermore, the inlet valve 7 is preferably opened by the negative pressure, so that fluid F present in the supply channel 11 at the inlet valve 7 flows or can flow through the inlet valve 7 into the interior chamber 5C of the bellows 5.

Preferably, the inlet valve 7 is formed by the conduit 12 and the bellows 5. In particular, the inlet valve 7 and/or the bellows 5 comprises a valve element 7A formed integrally/as one piece with the bellows 5. Preferably, in a closed position of the inlet valve 7, the valve element 7A fluid-tightly closes an opening 11A of the supply channel 11 and/or of the conduit 12 which opening 11A is located at the end side and/or opens into the interior chamber 5C. In particular, the opening 11A is covered in a sealing manner by the valve element 7A—at least in the closed position.

The valve element 7A is preferably held by one or more, in particular flexible and/or web-like arms of the bellows 5 (not shown). The valve element 7A is preferably biased, in particular by means of the arms, against the opening 11A and/or the supply channel 11.

The outlet valve 8 is preferably formed by an in particular ring-like sealing lip 8A, which—at least in the closed state of the outlet valve 8—lies in a sealing manner, in particular prestressed, against a counter surface 8B, which is preferably ring-like and/or arranged coaxially with the axis L. In an open position of the outlet valve 8, the sealing lip 8A is lifted from the counter surface 8B, so that a gap is formed between the sealing lip 8A and the counter surface 8B, through which the fluid F can exit the interior chamber 5C of the bellows 5 and enter the outlet channel 15.

Preferably, the conveyor housing 4A comprises or forms the counter surface 8B.

Preferably, the conveyor housing 4A has an aperture/cutout through which the fluid F enters the outlet channel 15 (not shown). As mentioned above, in the preferred embodiment shown, the outlet channel 15 is preferably arranged off-center at the conveyor housing 4A and is therefore located behind the sectional plane in FIG. 1 and FIGS. 2A to 2C. Accordingly, the aperture in the conveyor housing 4A is not visible/shown in the figures.

Preferably, the dispenser 1 and/or the dispensing device 2 is designed in such a way that, when the conveying device 4 is actuated, an automatic ventilation of the container 3 takes place and/or is effected, so that no (excessive) negative pressure is created in the dispenser 1 and/or the container 3 during and/or as a result of the conveying and/or dispensing of the fluid F from the container 3. Such a negative pressure could lead to a deformation of the container 3 and/or prevent or impede a (further) conveying of the fluid F from the container 3, which is undesirable.

The dispenser 1 and/or the dispensing device 2 is preferably designed/configured so that when the conveying device 4 is actuated, in particular when the bellows 5 and/or the base 9 is moved axially, a ventilation gap 17 is formed through which ventilation/aeration of the container 3 is made possible or takes place, as shown in particular in FIG. 2C.

Preferably, the dispensing device 2 comprises or forms a seat or guide 18 for the base 9 and/or the conduit 12.

The guide 18 is preferably ring-like and/or hollow cylindrical at least in portions. The guide 18 is in particular arranged coaxially to the axis L.

Preferably, the conduit 12 is held by the guide 18 and/or within the guide 18 and/or is arranged or arrangeable in the guide 18.

Preferably, the, in particular ring-like, ventilation gap 17 can be formed between the conduit 12 and the guide 18, in particular by the conduit 12 being lifted off or spaced apart from the guide 18 during an axial movement.

In particular, the ventilation gap 17 is formed between the guide 18 and the conduit 12 when the conveying device 4 is actuated, in particular when the bellows 5 is compressed and/or is deformed from the rest position to the compressed position and/or when the base 9 is moved axially upwards and/or towards the bellows 5 and/or upper housing part 14A.

The ventilation gap 17 is preferably formed during the axial movement of the base 9 and/or conduit 12 by the conduit 12 on the outside having or forming a (conically) tapered portion or an in particular conical taper 19, preferably in the region of the guide 18.

Due to the taper 19, the outer diameter of the conduit 12 is preferably changed, in particular reduced downwardly and/or with increasing distance from the bellows 5.

Due to the taper 19, in particular during an axial movement of the base 9 and/or conduit 12 (in the direction of the bellows 5 or upwards), the distance between the conduit 12 or taper 19 and the guide 18 is changed, in particular increased, so that the ventilation gap 17 is formed.

Preferably, the dispenser 1 and/or dispensing device 2 comprises an attachment or connection part 20.

Figure 3:
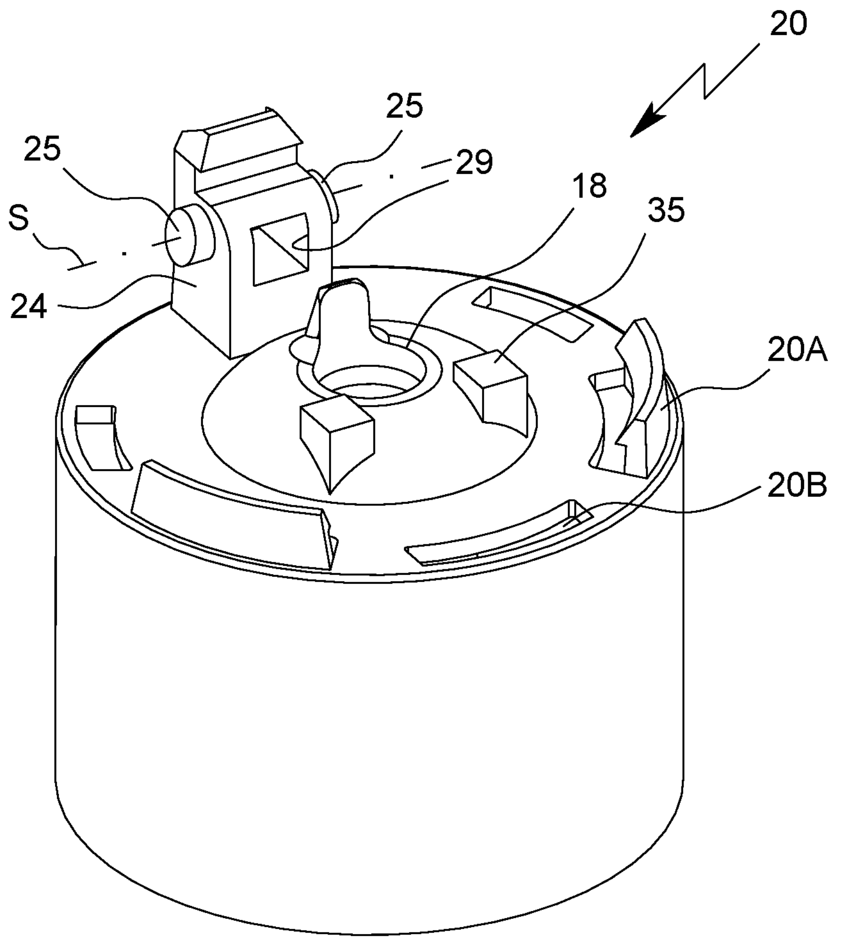
FIG. 3 is a perspective view of a connection part of the dispensing device with a bearing part for an actuating lever.

FIG. 3 shows a preferred embodiment of the connection part 20 in a perspective view.

Preferably, the connection part 20 comprises a supporting part or mounting part or bearing part 24 for pivotally supporting/mounting/bearing the actuating lever 21 and/or for forming a pivot axis S. This will be discussed in more detail later.

Preferably, the connection part 20 forms part of or a portion of an (overall) outer housing of the dispenser 1 or dispensing device 2, in particular together with the outer housing 14.

Preferably, the connection part 20 comprises or forms the guide 18.

Preferably, the dispensing device 2 is attached/fixed to the container 3 with or by the connection part 20. The connection part 20 can, for example, be screwed onto the container 3 and/or be connected to the container 3 in a latching, catching or snap-in manner. However, other solutions are also possible here.

The connection part 20 is preferably arranged axially between the container 3 (on the one side) and the bellows 5, the conveying device 4 and/or the outer housing 14 (on the other side).

The conveying device 4 and/or its conveyor housing 4A and/or the lower housing part 14B are/is preferably arranged (axially) between the connection part 20 and the upper housing part 14A, or connect/connects them to each other.

The connection part 20 is preferably connected or connectable to the conveying device 4, in particular the conveyor housing 4A, and/or the outer housing 14, in particular the lower housing part 14B, particularly preferably in a latching, catching or snap-in manner. For this purpose, the connection part 20 preferably comprises one or more catch, detent or latching elements 20A and/or recesses 20B, as shown in particular in FIG. 3. However, other solutions are also possible here, for example a screw connection or a material connection.

The outer housing 14, the upper housing part 14A, the lower housing part 14B, the fastening part 14C, the conveyor housing 4A and/or the connection part 20 may each be connected to one another in a force-fitting, form-fitting and/or bonded manner, in particular may be latched, snapped, clipped, clicked, screwed, glued, welded and/or injection-molded to one another. It is also possible for one or more of said parts 14, 14A, 14B, 14C, 4A, 20 to be integrally formed and/or to form different portions of a single component.

The dispensing device 2 and/or conveying device 4 comprises the actuating lever 21 for in particular manual actuation of the dispensing device 2 and/or conveying device 4. Preferably, actuation of the conveying device 4 and/or compression of the bellows 5 for dispensing of the fluid F is performed (exclusively) by (manual) actuation of the actuating lever 21 by a user not shown.

As already mentioned, it is also possible that the characteristics and features of the actuating lever 21 described below, in particular with respect to securing/locking against actuation, apply independently of the realization of the conveying device 4 by or with a flexible bellows and/or as a pumping device.

The actuating lever 21 is preferably pivotably arranged or pivotably supported/mounted on the dispensing device 2 and/or the conveyor housing 4A, outer housing 14 and/or connection part 20.

The pivot axis S about which the actuating lever 21 is pivotable—at least in the unlocked state—preferably extends transversely, in particular perpendicularly, to the axis L and/or, in the usual position of use, at least substantially horizontally.

The pivot axis S preferably lies or extends within the outer housing 14 and/or between the axis L and the outer housing 14 and/or in the vicinity of the outer housing 14.

Preferably, the actuating lever 21 comprises an actuating portion 22 at its free end and a lever arm 23 coupled in particular to the actuating portion 22 or is formed by them.

Preferably, the actuating portion 22 extends at least substantially, in particular completely, outside the outer housing 14 and/or the conveyor housing 4A.

Preferably, the lever arm 23 is arranged at least partially or predominantly within the outer housing 14, in particular the lower housing part 14B, and/or the conveyor housing 4A, or protrudes/projects into the same.

The lever arm 23 preferably extends transversely and in particular at least substantially perpendicularly to the axis L and/or to the pivot axis S.

The pivot axis S preferably runs or extends through the lever arm 23.

Preferably, the outer housing 14, in particular the lower housing part 14B, and/or the conveyor housing 4A have/has a cutout or aperture through which the actuating lever 21 or lever arm 23 is passed or can be passed.

Figure 4:
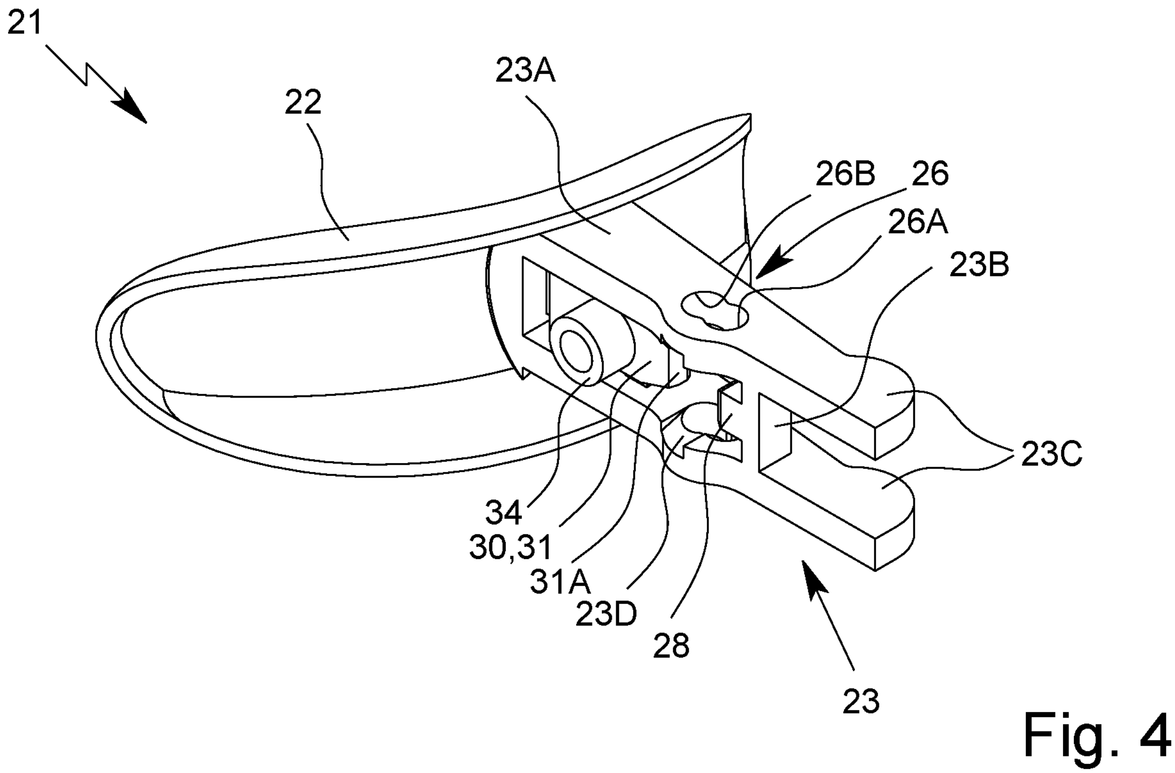
FIG. 4 is a perspective view of an actuating lever of the dispensing device.
Figure 5:
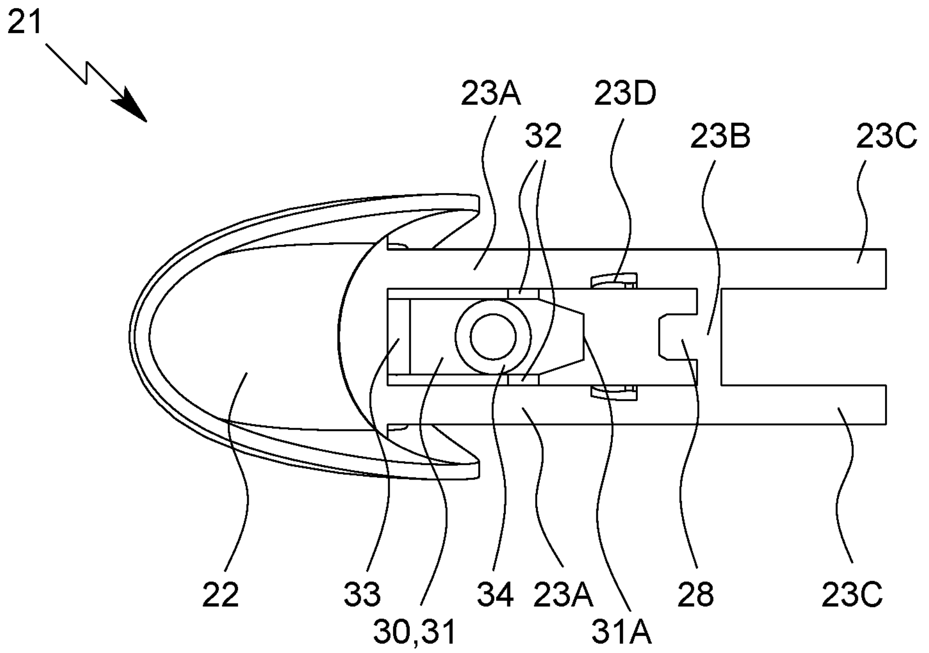
FIG. 5 is a view of the actuating lever from below.

In particular, the actuating lever 21 is shown in FIGS. 4 and 5. FIG. 4 is a perspective view of the actuating lever 21. FIG. 5 is a bottom view of the actuating lever 21 in the normal position of use of the dispenser 1 and/or dispensing device 2.

The actuating portion 22 is preferably designed/configured for manual actuation by a user not shown.

The actuating portion 22 may be curved or bent and/or ergonomically shaped. This is conducive to easy and comfortable operation.

The lever arm 23 is preferably configured for driving or activating the conveying device 4, in particular for actuating or compressing the bellows 5 and/or for axially moving the base 9, in particular upwards and/or towards the outlet 5B and/or the upper housing part 14A.

The lever arm 23 is preferably arranged off-center and/or at an end portion of the actuating portion 22, in particular so that an especially large leverage can be generated via the actuating portion 22 during actuation.

Preferably, the lever arm 23 and the actuating portion 22 are arranged transversely, in particular at least substantially perpendicularly, to each other.

Particularly preferably, the lever arm 23 comprises two, in particular arm-like or web-like, legs 23A extending parallel to each other, which on one side are connected to or arranged on the actuating portion 22. Preferably, the legs 23A are rigidly connected to one another by a portion 23B which is arranged transversely or at right angles to the legs 23A, for example at or in the vicinity of the end side opposite the actuating portion 22. In this way, a lever arm 23 is formed which is both stable and material-saving. However, other solutions are also possible here.

The dispensing device 2 preferably comprises a support part/mounting part/bearing part 24 on which the actuating lever 21, in particular the lever arm 23, is movably, in particular pivotably, mounted/supported or mountable/supportable.

In the illustrative example, the connection part 20 comprises or forms the bearing part 24, as shown in particular in FIG. 3. However, other solutions are also possible here. In particular, the bearing part 24 can also be arranged on or formed by the conveying device 4, in particular its conveyor housing 4A, the outer housing 14, in particular the lower housing part 14B, or another part of the dispensing device 2.

The bearing part 24 preferably comprises a supporting, mounting or bearing element 25, in particular a supporting, mounting or bearing pin. In the illustrative example, the bearing part 24 preferably comprises two opposing bearing elements 25.

Preferably, the pivot axis S extends through the bearing element(s) 25, and/or is defined by the bearing part 24 and/or the bearing element(s) 25, as shown in particular in FIG. 3.

The actuating lever 21 preferably comprises one or more supporting, mounting or bearing portions 26 corresponding to the bearing part 24 and/or the bearing element(s) 25. The bearing portion(s) 26 are preferably recesses for engagement of the bearing element(s) 25 and/or latching elements for latching with the bearing element(s) 25.

In the illustrative example, a respective bearing element 25 preferably engages a respective leg 23A of the lever arm 23, and/or each of the legs 23A has corresponding bearing portions 26 for a bearing element 25.

However, other solutions are also possible here. For example, conversely, the bearing part 24 could have one or more bearing portions 26, in particular recesses, and the actuating lever 21, in particular the lever arm 23, could have one or more bearing elements 25.

Figure 6A:
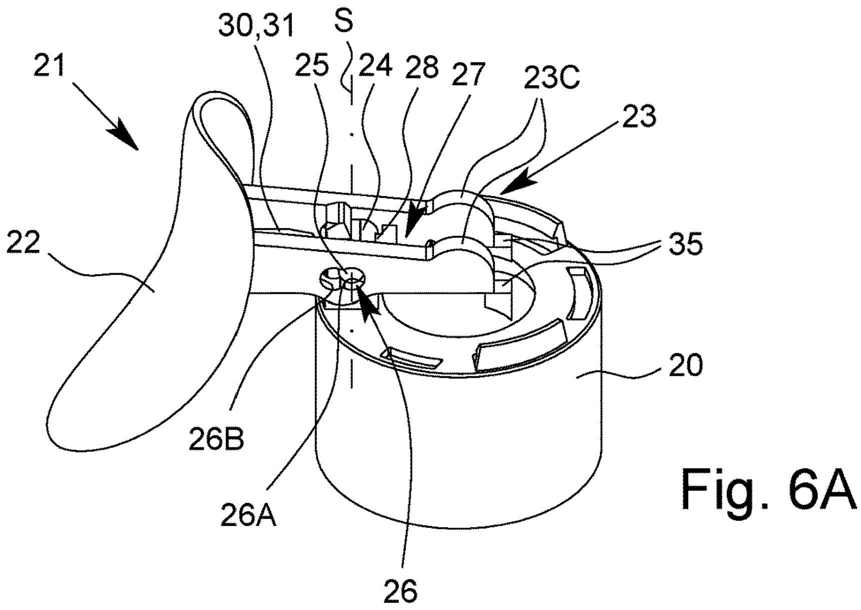
FIG. 6A is a perspective view of the actuating lever and connection part in the locked state.
Figure 6B:
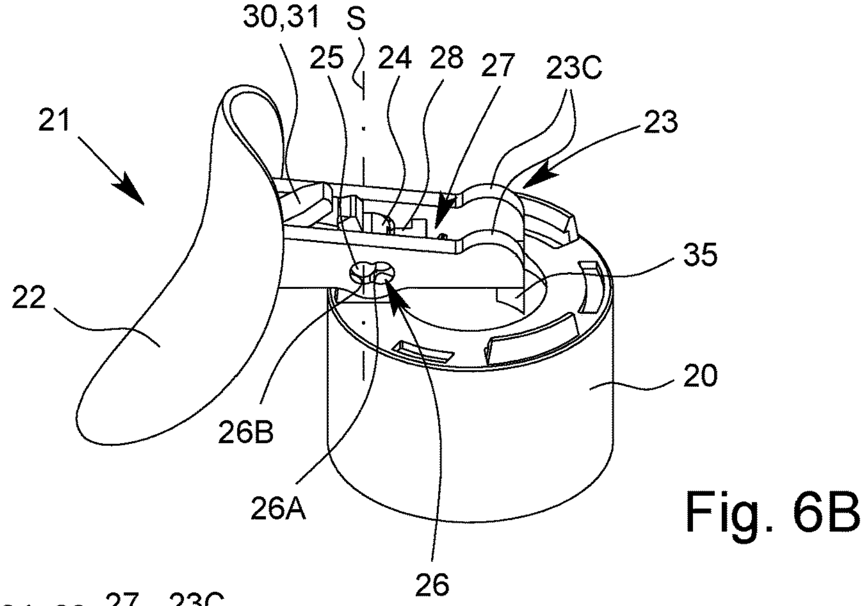
FIG. 6B is a perspective view of FIG. 6A in the unlocked state.
Figure 6C:
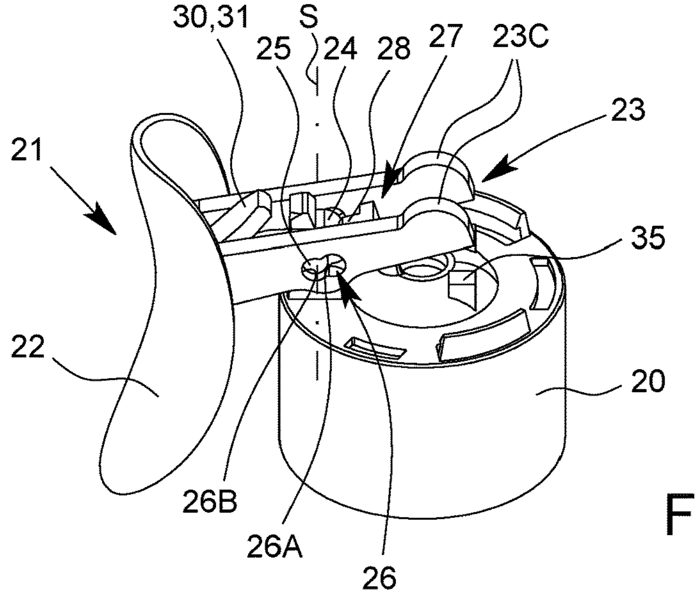
FIG. 6C is a perspective view according to FIG. 6A in the actuated state.

FIGS. 6A to 6C show perspective views of the actuating lever 21 connected to the bearing part 24 in three different positions corresponding to the positions shown in FIGS. 2A to 2C. FIG. 6A shows the actuating lever 21 in the locked position, corresponding to FIG. 2A. FIG. 6B shows the actuating lever 21 in the unlocked, unactuated position or actuation position, corresponding to FIG. 2B. FIG. 6C shows the actuating lever 21 in the actuated or pivoted position, corresponding to FIG. 2C.

The respective positions of the actuating lever 21 and the associated locking, securing and actuating mechanisms, locking, securing and actuating devices and/or locking, securing and actuating states are explained in more detail below.

The locked position of the actuating lever 21 and/or of a locking device 27 of the dispensing device 2 is shown in FIGS. 1, 2A and 6A. The dispenser 1 and/or the dispensing device 2 is accordingly in a locked state.

In the locked state and/or in the locked position, actuation and/or pivoting of the actuating lever 21 is preferably locked or blocked. In particular, an activation or actuation of the conveying device 4 and/or a dispensing of fluid F is locked or blocked/inhibited.

Preferably, the dispensing device 2 comprises a locking device 27 which locks or blocks/inhibits the actuation of the actuating lever 21 and/or the conveying device 4 in the locked state or locked position.

The locking device 27 or the locked state is preferably realized or formed by a form closure/form fit/positive locking, in particular of or between the actuating lever 21 and bearing part 24.

Preferably, the locking device 27 comprises a locking element 28.

In the locked position or locked state, the locking element 28 preferably engages positively or in a form-fitting manner in a corresponding recess 29.

Preferably, the locking device 27 is formed by and/or comprises the locking element 28 and the recess 29.

In the illustrative example, the locking element 28 is arranged or formed on the actuating lever 21, in particular on the lever arm 23, particularly preferably on its portion 23B, as shown in particular in FIGS. 4 and 5.

Preferably, the locking element 28 is integrally formed or manufactured with the actuating lever 21 and/or lever arm 23.

The locking element 28 is preferably cuboidal, in particular at least substantially cube-shaped.

In the illustrative example, the bearing part 24 preferably has or forms the recess 29, as shown in particular in FIG. 3. However, other solutions are also possible here. For example, the recess 29 could also be arranged or formed at another location of the connection part 20, on the conveying device 4, in particular its conveyor housing 4A, and/or on the outer housing 14, in particular on the lower housing part 14B.

The recess 29 is preferably formed to correspond to the locking element 28. Particularly preferably, the recess 29 extends through the bearing part 24 and/or transversely, in particular perpendicularly, to the pivot axis S and/or, in the position of use, horizontally and/or in radial direction.

Preferably, in the locked position, the locking element 28 extends into the recess 29 in radial direction and/or, in the position of use, horizontally, particularly preferably radially outwardly and/or away from the longitudinal axis L and/or radially with respect to the pivot axis S.

Solutions are also possible in which the actuating lever 21, in particular the lever arm 23, has the recess 29 and a corresponding locking element 28 is arranged or formed on the connection part 20, the bearing part 24, the conveying device 4, in particular the conveyor housing 4A, or the outer housing 14, in particular the lower housing part 14B.

The positive locking/form fit is thus formed in particular between the actuating lever 21 and a further component of the dispensing device 2, preferably the bearing part 24, in the locked position or locked state.

Due to the locking device 27, in particular the positive locking/form fit and/or the engagement of the locking element 28 in the recess 29 in the locked state, actuation or pivoting of the actuating lever 21 is preferably locked or blocked/inhibited.

FIG. 2B and FIG. 6B show the actuating lever 21 and/or the locking device 27 in the unlocked position or actuation position in which actuation of the actuating lever 21 and/or of the conveying device 4 is possible or enabled. In particular, the actuating lever 21 and/or the locking device 27 is unlocked and/or the positive lock/form fit/form closure formed in the locked position and/or the locked state is cancelled or released. Accordingly, the dispenser 1 and/or the dispensing device 2 is preferably in an unlocked state.

In the actuation position, the locking element 28 is preferably free and/or is not (any longer) in engagement. In particular, the locking element 28 is not (any longer) engaged with the recess 29 and/or is (completely) arranged outside the recess 29, particularly preferably in such a way that pivoting of the actuating lever 21, in particular together with the locking element 28, is possible or enabled.

For unlocking or for assuming the actuation position, the actuating lever 21 is preferably (manually) displaceable or shiftable. The actuating lever 21 and/or the locking element 28 can thus preferably be displaced or shifted or moved from the locked position into the actuation position.

The displacement/shifting of the actuating lever 21 preferably causes the locking element 28 to be pushed out of the recess 29 and/or the form closure or (positive) locking of the locking device 27 to be released.

Particularly preferably, the actuating lever 21 is linearly and/or in radial direction displaceable or pushable, in particular inwardly or in the direction of the longitudinal axis L, of the bearing part 24 and/or of the pivot bearing or pivot axis S.

For moving or displacing/shifting the actuating lever 21 from the locked position to the actuation position, the actuating portion 22 is preferably movable or pushable in the direction of the longitudinal axis L, the bearing part 24, the pivot bearing or pivot axis S, the conveying device 4 and/or the outer housing 14.

In the actuation position, the actuating portion 22 is also preferably arranged completely outside the outer housing 14. The distance between the outer housing 14, in particular the lower housing part 14B and the actuating portion 22, is preferably smaller in the actuation position than in the locked position.

The lever arm 23 is preferably pressable/pushable (further) into the outer housing 14 and/or the conveying device 4, in particular the conveyor housing 4A. In particular, the lever arm 23 is to a greater extent inside the outer housing 14 and/or the conveyor housing 4A in the actuation position than in the locked position. The locking element 28, which is preferably formed integrally with the lever arm 23, is preferably displaced/shifted accordingly, in particular in the direction of the longitudinal axis L.

Solutions are also possible in which the actuating lever 21 is brought from the locked position to the actuation position by another movement. For example, the actuating lever 21, in particular the lever arm 23, could be partially pullable/withdrawable in order to get from the locked position to the actuation position and/or in order to release the form closure or (positive) locking of the locking device 27, in particular to pull the locking element 28 out of the recess 29.

Preferably, the dispensing device 2 and/or the actuating lever 21 and/or the locking device 27 can be locked again after unlocking and/or is lockable again and/or is displaceable from the actuation position (again) into the locked position. In particular, the (positive) locking realized by the locking device 27 or the form closure/form fit can be restored and/or the locking element 28 can be brought into engagement (again), in particular with the recess 29.

Particularly preferably, the actuating lever 21 is linearly displaceable in the opposite direction than during unlocking in order to (re)lock the dispensing device 2 and/or the actuating lever 21. Particularly preferably, the actuating lever 21, in particular the lever arm 23, is partially extractable/withdrawable/pullable from the outer housing 14 and/or the conveyor housing 4A and/or movable in radial direction away from the longitudinal axis L in order to (re)assume the locked position.

However, other solutions are also possible here, in particular in which the unlocking is irreversible. For example, the actuating lever 21 could latch/engage irreversibly in the actuation position during unlocking or the like.

The bearing part 24 and/or the bearing portion(s) 26 are/is preferably designed to hold or support/mount/bear the actuating lever 21, in particular the lever arm 23, in a displaceable manner, in particular in such a way that it can be displaced from the locked position into the actuation position, and particularly preferably also back from the actuation position into the locked position if required.

As previously mentioned, the bearing part 24 preferably comprises one or more bearing elements 25, in the illustrative example two bearing elements 25 arranged on opposite sides, in particular bearing pins. The actuating lever 21 in particular the lever arm 23, preferably has corresponding bearing portions 26 in which the bearing elements 25 engage for bearing, as shown in particular in FIGS. 6A to 6C.

Preferably, the displaceability of the actuating lever 21 is realized by the bearing portions 26. In particular, the bearing portions 26 are configured to allow the actuating lever 21 to be displaced/shifted. For example, the bearing portions 26 could be formed as elongated holes formed in the lever arm 23, in which the bearing elements 25 of the bearing part 24 are held or supported/mounted in a longitudinally displaceable manner.

Preferably, the actuating lever 21 and the bearing part 24 are connected to each other in a form-fitting manner in the locked position and/or the actuation position, particularly preferably both in the locked position and the actuation position, in particular are or can be latched, engaged, interlocked, snapped, clipped or clicked (together). In particular, the (respective) bearing elements 25 are or can be latched, engaged, interlocked, snapped, clipped or clicked in/into the corresponding (respective) bearing portions 26.

In the following, a particularly preferred embodiment of the displaceable bearing arrangement is described using the example of one bearing element 25 and one bearing portion 26. If, as in the illustrative example, the bearing arrangement has a further bearing element 25 and/or a further bearing portion 26, the explanations preferably apply accordingly.

Particularly preferably, the bearing portion 26 comprises a first sub-portion 26A and a second sub-portion 26B.

In the locked position, the bearing element 25 is preferably held or supported, in particular in a latching or engaging or snap-fit manner, in the first sub-portion 26A, as shown in particular in FIG. 6A.

In the actuation position, the bearing element 25 is preferably held or supported, in particular in a latching or engaging or snap-fit manner, in the second sub-portion 26B, as shown in particular in FIG. 6B.

Preferably, the pivot axis S passes through the first sub-portion 26A in the locked position and/or through the second sub-portion 26B in the actuation position. Preferably, pivoting of the actuating lever 21 is only possible when the pivot axis S passes through both the bearing element 25 and the sub-portion 26B. For the locked position, the pivot axis S is preferably to be understood as the axis on which the actuation lever 21 is supported/mounted and/or about which the actuating lever 21 would pivot if no locking device 27 or locking element 28 was provided.

When the actuating lever 21 is displaced, in particular when it is pushed in, and/or when unlocking, the bearing element 25 is preferably displaced or moved out of the first sub-portion 26A and/or displaced or moved into the second sub-portion 26B. However, this displacement preferably takes place only relative to the actuating lever 21. In particular, the bearing element 25 is stationary or immobile relative to the bearing part 24, connection part 20, conveyor housing 4A and/or outer housing 14. Preferably, the component actually moving is the actuating lever 21 or bearing portion 26 which causes the displacement of the bearing element 25 from the first sub-portion 26A to the second sub-portion 26B formed by the actuation lever 21 or bearing portion 26.

In the illustrative example, the bearing portion 26 is preferably formed as an eight-shaped recess, and/or the sub-portions 26A, 26B are formed as overlapping circular recesses. However, other solutions are also possible here.

It would also be possible, for example, for a first bearing element 25 to engage in a recess formed by the bearing portion 26, in particular a circular recess, in the locked position and for a second bearing element 25 to engage in the same recess in the actuation position. In this case, therefore, during displacement the first bearing element 25 would be disengaged from an engagement with the bearing portion 26 and subsequently the second bearing element 25 would be engaged with the bearing portion 26.

FIG. 2C and FIG. 6C show the actuating lever 21 in the actuated position or pivoted position. Preferably, the actuating lever 21 is pivotable between the unactuated position or actuation position shown in FIGS. 2B and 6B and the actuated position or pivoted position shown in FIGS. 2C and 6C, in particular about the pivot axis S.

Preferably, the movement from the actuation position to the pivoted position is effected by a manual actuation or pivoting of the actuating lever 21 by a user not shown.

The actuating lever 21 and/or the lever arm 23 preferably has an arm portion 23C. In the illustrative example, two arm portions 23C are formed by the respective ends of the legs 23A opposite to the actuating portion 22.

Preferably, the base 9, in particular the bottom element 10, forms or comprises a counter surface or actuating surface for the actuating lever 21 or lever arm 23 or the arm portion(s) 23C. The actuating lever 21 or lever arm 23, in particular the arm portion(s) 23C, preferably abut(s) the bottom element 10 or the actuating surface formed thereby and/or acts thereon and/or exerts a force thereon, in particular when pivoting from the actuation position to the pivoted position.

By an actuation of the actuating lever 21 and/or the actuating portion 22, in particular by a pivoting from the actuation position into the pivoted position, the bellows 5 is preferably actuated and/or compressed and/or deformed or moved from the rest position into the compressed position. This is achieved in particular by rotating the lever arm 23 about the pivot axis S and/or the bearing part 24, in particular the bearing element(s) 25, during the actuation or pivoting movement, so that the arm portion(s) 23C and/or an end of the lever arm 23 associated with or facing the base 9 is lifted or moved towards the bellows 5.

In particular, an actuation of the actuating lever 21 and/or a pivoting of the actuating lever 21 from the actuation position to the pivoted position thus causes a compression of the bellows 5 and/or a discharge of the fluid F.

The pivot axis S, the bearing part 24, in particular the bearing elements 25, and/or the actuating lever 21, in particular the bearing portions 26, are/is preferably arranged in such a way that a small pivot angle results in a (comparatively) large stroke/lifting of the lever arm 23 or arm portion(s) 23C, and/or that the force acting on the conveying device 4—compared to a force acting on the actuating portion 22—is increased.

The pivot axis S and/or the bearing elements 25 and/or bearing portions 26 are/is preferably arranged or formed within the outer housing 14 at an especially large distance from the axis L and/or close to the outer housing 14 and/or closer to the outer housing 14 than to the axis L.

Preferably, a movement of the actuating lever 21 from the actuated position or pivoted position (back) to the unactuated position or actuation position is automatic and/or does not require an active movement or actuation of the actuating lever 21. Preferably, a movement from the pivoted position to the actuation position can be effected by a user releasing or letting go of the actuating portion 22.

The expansion of the bellows 5 and/or the movement of the actuating lever 21 from the pivoted position to the actuation position, in particular caused by the expansion, is preferably effected by the (elastic) restoring force caused by the preceding elastic deformation or compression of the bellows 5. During the expansion of the bellows 5, preferably the base 9 and/or the bottom element 10 or the actuating surface formed thereby acts on or exerts a force on the actuating lever 21 and/or lever arm 23, so that the actuating lever 21 is (automatically) moved or pivoted from the pivoted position to the actuation position.

Preferably, the pivoting travel of the actuating lever 21 is limited, for example by corresponding stops 23D on the actuating lever 21 and/or lever arm 23, which are shown in particular in FIGS. 4 and 5.

Preferably, the actuating lever 21 is supported from below in the actuation position, in particular by supports 35, which are shown in particular in FIG. 3 and FIGS. 6A to 6C. Preferably, the pivoting travel is limited by the supports 35 when pivoting back.

As previously mentioned, the construction/design of the dispensing device 2 and/or conveying device 4 with bellows is merely preferred. Accordingly, solutions are also possible in which pivoting the actuating lever 21 and/or raising the lever arm 23 and/or arm portion(s) 23C causes in a different way activation of the conveying device 4 and/or conveying and/or dispensing of the fluid F.

Preferably, the dispensing device 2 comprises a protection device or safety device or securing device 30 in addition to the locking device 27.

The securing device 30 is preferably designed to block an unlocking of the dispensing device 2, of the actuating lever 21 and/or of the locking device 27 and/or to secure or protect the dispensing device 2, the actuating lever 21 and/or the locking device 27 against an (accidental or undesired) unlocking, in particular to block a displacing/shifting of the actuating lever 21 from the locked position into the actuation position.

Preferably, in principle, the securing device 30 may also be understood as a second locking device, locking the first locking device 27 or its unlocking mechanism. However, in order to properly distinguish the two devices and their functioning in this description, terms including "lock" such as "locked", "unlocking", etc. preferably refer exclusively to (un)locking by means of the locking device 27, while for the securing device 30 terms like "secured" etc. are used, unless explicitly mentioned otherwise.

The position of the securing device 30 in which the unlocking is secured or blocked is hereinafter referred to as the securing position. This position is shown in particular in FIG. 2A.

In its delivery state or before first use, the dispenser 1 and/or the dispensing device 2 is preferably locked by means of the locking device 27 and secured by means of the securing device 30.

The securing device 30 preferably comprises or is formed by a securing element 31. The securing element 31 is preferably designed to block an unlocking of the dispensing device 2, of the actuating lever 21 and/or of the locking device 27 in the securing position, preferably by form fit. In particular, the securing element 31 and/or the securing device 30 prevents the form closure or (positive) lock formed by the locking device 27 from being removed/cancelled and/or the locking element 28 from being removed or pushed out of the recess 29.

The securing element 31 is preferably elongated and/or rod-like.

Preferably, the securing device 30 and/or the securing element 31 acts in the securing position between the actuating portion 22 and the outer housing 14, in particular the lower housing part 14B and/or the connection part 20.

In particular, the securing element 31 is arranged or fixed in the securing position between the actuating portion 22 and another part of the dispensing device 2, in particular the outer housing 14 or lower housing part 14B and/or the connection part 20, so that the actuating lever 21 cannot be moved out of the locked position and/or is secured against unlocking.

Preferably, the securing device 30 and/or the securing element 31 extends in the securing position transversely, in particular perpendicularly, to the actuating portion 22 and/or at least substantially parallel to the lever arm 23 and/or in radial direction.

Particularly preferably, the securing device 30 and/or the securing element 31 is arranged or formed between the legs 23A of the lever arm 23.

Preferably, the securing device 30 and/or the securing element 31 is integrally formed with or molded to the actuating portion 22 and/or the lever arm 23.

Particularly preferably, the securing device 30 and/or the securing element 31 is connected to the actuating lever 21, the actuating portion 22 and/or the lever arm 23 by a material bond and/or forms part of the actuating lever 21.

Particularly preferably, the securing device 30 and/or the securing element 31 is rigidly and/or immovably arranged or held on the actuating lever 21.

Preferably, the securing device 30 and/or the securing element 31 comprises a contact surface 31A with which the securing device 30 and/or the securing element 31, in the securing position, abuts against the outer housing 14, in particular the lower housing part 14B, the connection part 20 or another (housing) portion of the dispensing device 2, and/or comes into abutment or contact before the actuating lever 21 reaches the unlocked position or actuation position. By the abutment or contact, a displacement of the actuating lever 21 into the unlocked position or actuation position is preferably blocked or secured.

Solutions are also possible in which the securing device 30 and/or the securing element 31, conversely, comes into contact with the actuating lever 21, in particular the actuating portion 22, and is connected to the outer housing 14 or the connection part 20 or another (housing) part of the dispensing device 2 in a bonded manner or is formed thereby. Solutions are also possible in which the securing device 30 and/or the securing element 31 is clamped between the actuating portion 22 and a corresponding housing part in a force-fitting and/or form-fitting manner, or is connected both to the actuating lever 21 and to a housing part by a material bond.

To release the securing/protection by means of the securing device 30 or to unsecure/unprotect the dispensing device 2, the actuating lever 21 and/or the locking device 27, the securing device 30 and/or the securing element 31 is preferably movable from the securing position into an unsecured or released position.

The securing element 31 is preferably releasable and/or movable into the unsecured or released position by applying a force transverse to the main extension direction of the securing element 31.

In the unsecured or released position, the securing element 31 is preferably arranged in such a way that the actuating lever 21 can be displaced/shifted and/or that the dispensing device 2, the actuating lever 21 and/or the locking device 27 can be unlocked, in particular without restriction or obstruction of the unlocking by the securing element 31. In the unsecured or released position, the locking device 27 and/or the displacement/shifting of the actuating lever 21 is preferably released/enabled.

Preferably, the securing device 30 and/or the securing element 31 can be pushed/pressed in, hinged away, folded away and/or folded up, in particular transversely to its longitudinal extension and/or in axial direction.

The securing device 30 and/or the securing element 31 preferably comprises one or more predetermined breaking points 32, a connecting piece 33 and/or an actuating element 34.

The actuating element 34 is preferably formed by a raised portion or the like, against which a user, not shown, can press for pushing in or actuating the securing element 31 and/or for releasing.

When the actuating element 34 is actuated or pressed and/or when releasing, the retaining means of the securing element 31 preferably breaks at predetermined breaking points 32 provided for this purpose. The predetermined breaking points 32 are shown in FIG. 5. In the illustrative example, these are formed as connecting pieces or arms between the securing element 31 and the actuating lever 21, in particular the lever arm 23. However, other solutions are also possible here.

Preferably, a connecting piece 33 is formed between the actuating portion 22 and the securing element 31, via which the securing element 31 can be folded away or up, pushed away or up, and/or hinged away or up, in particular by actuating or pressing the actuating element 34, preferably after breaking the predetermined breaking points 32. The connecting piece 33 is preferably formed as a film hinge.

Alternatively, the securing device 30 and/or the securing element 31 may also be (completely) removable or breakable from the dispensing device 2, in particular the actuating lever 21.

When the securing device 30 and/or the securing element 31 has been moved out of the securing position, in particular has been folded away, folded up, hinged away, pressed in or removed, the dispensing device 2, the actuating lever 21 and/or the locking device 27 is preferably released, unblocked, unsecured, unprotected and/or not (anymore) blocked.

In particular, the contact surface 31A no longer comes into contact. A movement or displacement of the actuating lever 21 from the locked position into the actuation position is then possible or enabled.

Re-securing is preferably not possible. This is achieved in particular by the securing element 31 irreversibly breaking at the predetermined breaking points 32. However, other solutions are also possible here. In particular, if the securing element 31 is held clamped in the securing position, it would be conceivable to (re)secure the dispensing device 2, the actuating lever 21 and/or the locking device 27 by (re) clamping the securing element 31.

Preferably, the securing device 30 and/or the securing element 31 serves as a tamper-evident seal. This is achieved in particular by the fact that re-securing is not possible and/or that the securing element 31 irreversibly breaks at the predetermined breaking points 32. A user can therefore tell whether the dispenser 1 and/or the dispensing device 2 is still in the delivery state or has already been used by looking at the position of the securing device 30 and/or the securing element 31, in particular whether it is in the securing position, and/or looking at the state of the securing device 30 and/or the securing element 31, in particular whether it has already been actuated or removed and/or has broken at the predetermined breaking points 32.

Preferably, the actuating lever 21, in particular together with the locking element 28 and/or the securing element 31, is made in one piece and/or in a common manufacturing process, in particular by injection molding.

A preferred method of assembling the dispensing device 2 is described below.

First, the actuating lever 21 is placed in the actuation position on the connection part 20 or bearing part 24 as shown in FIG. 6B (but with the securing device 30 or securing element 31 intact and not folded up as shown in FIG. 6B).

Then, the actuating lever 21 is preferably displaced/shifted or moved to the locked position, in particular so that the locking element 28 comes into engagement, in particular with the recess 29. This position is shown in FIG. 6A. In this position, a gap is preferably formed between the securing element 31 or its contact surface 31A and the connection part 20 or the bearing part 24. The outer housing 14, in particular the lower housing part 14B, is preferably placed on the connection part 20 from above, in particular connected thereto in a latching or snap-fitting manner, the gap preferably being filled by the outer housing 14 or the lower housing part 14B, so that the securing element 31 or the contact surface 31A abuts against the outer housing 14 or lower housing part 14B. The actuating lever 21 is thus locked and secured.

In general, the locking and/or securing mechanism of the proposed actuating lever 21 can also be implemented without a pumping device or pump. For example, the dispenser 1 or container 3 may be pressurized, in particular by means of a propellant gas. In this case, the conveying device 4 is preferably designed as a valve or comprises a valve. When the conveying device 4 is actuated and/or the valve is open, the fluid F is preferably automatically dispensed from the dispenser 1 or the dispensing device 2 by the increased pressure. By actuating the actuating lever 21, the conveying device 4 can preferably be controlled or activated, in particular the valve can be opened.

Particularly preferably, the dispenser 1 and/or the dispensing device 2 are recyclable or made (exclusively) of recyclable material or recyclable plastic. In particular, the container 3, the conveying device 4, the conveyor housing 4A, the bellows 5, the base 9, the riser 13, the outer housing 14, the outlet channel 15, the connection part 20, the actuating lever 21, the bearing part 24, the locking device 27, the locking element 28, the securing device 30, the securing element 31, the closure element/dispensing element 36 and/or other components of the dispensing device 2 and/or of the dispenser 1, particularly preferably all components of the dispensing device 2 and/or of the dispenser 1, are made of or formed from recyclable material or recyclable plastic and/or plastic from the polyethylene family.

Individual aspects and features of the present invention, in particular of the different embodiments, may be realized and advantageous individually and in any combination.

Reference List:

| | |
|---|---|
| 1 | Dispenser |
| 2 | Dispensing device |
| 3 | Container |
| 4 | Conveying device |
| 4A | Conveyor housing |
| 5 | Bellows |
| 5A | Inlet |
| 5B | Outlet |
| 5C | Interior chamber |
| 6 | Side wall |
| 7 | Inlet valve |
| 7A | Valve element |
| 8 | Outlet valve |
| 8A | Sealing lip |
| 8B | Counter surface |
| 9 | Base |

-continued

| Reference List: | |
|---|---|
| 10 | Bottom element |
| 11 | Supply channel |
| 11A | Opening |
| 12 | Conduit |
| 13 | Riser |
| 14 | Outer Housing |
| 14A | Upper housing part |
| 14B | Lower housing part |
| 14C | Fastening part |
| 15 | Outlet channel |
| 16 | Channel opening |
| 17 | Ventilation gap |
| 18 | Guide |
| 19 | Taper |
| 20 | Connection part |
| 20A | Latching element |
| 20B | Recess |
| 21 | Actuating lever |
| 22 | Actuating portion |
| 23 | Lever arm |
| 23A | Leg |
| 23B | Portion |
| 23C | Arm portion |
| 23D | Stop |
| 24 | Bearing part |
| 25 | Bearing element |
| 26 | Bearing portion |
| 26A | Sub-portion |
| 26B | Sub-portion |
| 27 | Locking device |
| 28 | Locking element |
| 29 | Recess |
| 30 | Securing device |
| 31 | Securing element |
| 31A | Contact surface |
| 32 | Predetermined breaking point |
| 33 | Connecting piece |
| 34 | Actuating element |
| 35 | Support |
| 36 | Closure element/dispensing element |
| F | Fluid |
| L | Axis |
| S | Pivot axis |

The invention claimed is:

1. A dispensing device for dispensing a fluid, wherein the dispensing device comprises a conveying device, an actuating lever pivotable for actuating the conveying device, and a bearing part for pivotally supporting the actuating lever,
   - wherein the dispensing device comprises a locking device which locks the actuating lever against undesired pivoting in a locked position, and
   - wherein the actuating lever is displaceable relative to the bearing part from the locked position into an actuation position, pivoting of the actuating lever being enabled in the actuation position.

2. A dispensing device for dispensing a fluid, wherein the dispensing device comprises a conveying device, an actuating lever pivotable for actuating the conveying device, and a bearing part for pivotally supporting the actuating lever,
   - wherein the dispensing device comprises a locking device which locks the actuating lever against undesired pivoting in a locked position, and
   - wherein the dispensing device has a securing device which secures the actuating lever against unlocking by means of the locking device, and
   - wherein the securing device comprises a securing element which blocks unlocking by means of the locking device.

3. The dispensing device according to claim 2, wherein the securing element is held on the actuating lever and/or in a securing position in a materially bonded manner and/or by a predetermined breaking point.

4. The dispensing device according to claim 2, wherein the securing element comprises an actuating element formed by a raised portion against which a user can press for pushing in or actuating the securing element and/or for releasing the unlocking by means of the locking device.

5. The dispensing device according to claim 2, wherein the securing element can be pushed in, folded away and/or folded up.

6. The dispensing device according to claim 2, wherein the securing element is removable from the dispensing device or the actuating lever.

7. The dispensing device according to claim 2, wherein the actuating lever comprises an actuating portion for manual actuation and a lever arm for driving or activating the conveying device.

8. The dispensing device according to claim 7, wherein the lever arm comprises two legs extending parallel to each other, wherein the securing element is arranged or formed between the legs.

9. The dispensing device according to claim 7, wherein the securing element is integrally formed with or molded to the actuating portion and/or the lever arm.

10. A dispenser for dispensing a fluid with a dispensing device and a container, wherein the fluid can be conveyed out of the container by means of the dispensing device and dispensed by means of the dispensing device,
   - wherein the dispensing device comprises a conveying device, an actuating lever pivotable for actuating the conveying device, and a bearing part for pivotally supporting the actuating lever,
   - wherein the dispensing device comprises a locking device which locks the actuating lever against undesired pivoting in a locked position, and
   - wherein the dispenser has at least one of the following features:
   - the actuating lever being displaceable relative to the bearing part from the locked position into an actuation position, pivoting of the actuating lever being enabled in the actuation position, or
   - the dispensing device having a securing device which secures the actuating lever against unlocking by means of the locking device.

11. A dispensing device configured to dispense a fluid comprising:
   - a conveying device including at least one valve,
   - a pivotable actuating lever configured to actuate the conveying device,
   - a bearing part configured to pivotally support the actuating lever on one or more bearing elements,
   - a locking device configured to lock the actuating lever against undesired pivoting in a locked position, wherein the locking device includes:
     - a locking element on the actuating lever and a corresponding recess in the bearing part, or
     - a locking element on the bearing part and a corresponding recess in the actuating lever, and
   - wherein the actuating lever is displaceable relative to the bearing part from the locked position into an actuation position, and pivoting of the actuating lever is enabled in the actuation position.

12. The dispensing device according to claim 11, wherein the actuating lever is linearly displaceable from the locked position to the actuation position.

13. The dispensing device according to claim 11, wherein the actuating lever is locked against pivoting by a form fit in the locked position.

14. The dispensing device according to claim 11, wherein the unlocking of the actuating lever is reversible and/or wherein the actuating lever is movable from the actuation position to the locked position.

15. The dispensing device according to claim 11, wherein the actuating lever can be pushed in a direction of a housing part of the dispensing device for unlocking, and/or can be pulled in an opposite direction for locking.

16. The dispensing device according to claim 11, wherein the actuating lever comprises a securing element which blocks the displacement of the actuating lever from the locked position to the actuation position.

17. The dispensing device according to claim 16, wherein the securing element abuts against a housing part of the dispensing device so that the displacement of the actuating lever is blocked.

18. The dispensing device according to claim 16, wherein the securing element is held on the actuating lever and/or in a securing position in a materially bonded manner and/or by a predetermined breaking point.

19. The dispensing device according to claim 16, wherein the securing element can be at least one of pushed in, folded away, or folded up, and/or wherein the securing element is removable from the dispensing device or the actuating lever in order to enable the displacement of the actuating lever from the locked position to the actuation position.

* * * * *